(12) United States Patent
Gayton et al.

(10) Patent No.: US 10,467,551 B2
(45) Date of Patent: Nov. 5, 2019

(54) PORTABLE PRIVACY MANAGEMENT

(71) Applicant: FORD MOTOR COMPANY, Dearborn, MI (US)

(72) Inventors: Bradley Michael Gayton, Ann Arbor, MI (US); Joseph A. Kidd, Ottawa Hills, OH (US); Deborah N. Gertsen, Dearborn, MI (US); Elliot S. Katz, San Francisco, CA (US)

(73) Assignee: Ford Motor Company, Dearborn, MI (US)

( * ) Notice: Subject to any disclaimer, the term of this patent is extended or adjusted under 35 U.S.C. 154(b) by 118 days.

(21) Appl. No.: 15/620,215

(22) Filed: Jun. 12, 2017

(65) Prior Publication Data

US 2018/0357438 A1 Dec. 13, 2018

(51) Int. Cl.
| | |
|---|---|
| *G06N 20/00* | (2019.01) |
| *H04W 12/08* | (2009.01) |
| *H04W 12/02* | (2009.01) |
| *G06F 21/62* | (2013.01) |
| *G01C 21/00* | (2006.01) |
| *H04L 29/06* | (2006.01) |
| *H04W 4/40* | (2018.01) |

(52) U.S. Cl.
CPC ............ *G06N 20/00* (2019.01); *G01C 21/00* (2013.01); *G06F 21/6245* (2013.01); *H04W 12/02* (2013.01); *H04W 12/08* (2013.01); *H04L 63/102* (2013.01); *H04W 4/40* (2018.02)

(58) Field of Classification Search
CPC ............ G06F 21/6218; G06F 21/6245; G06N 99/005; G06N 20/00; H04L 63/102; H04W 12/08; H04W 12/02; H04W 4/40; G01C 21/00
See application file for complete search history.

(56) References Cited

U.S. PATENT DOCUMENTS

| | | |
|---|---|---|
| 4,175,339 A | 11/1979 | Jones |
| 5,815,195 A | 9/1998 | Tam |
| 5,947,747 A | 9/1999 | Walker et al. |

(Continued)

FOREIGN PATENT DOCUMENTS

| | | |
|---|---|---|
| DE | 10327291 A | 2/2005 |
| DE | 102005034692 A1 | 2/2007 |

(Continued)

*Primary Examiner* — Matthew Smithers
(74) *Attorney, Agent, or Firm* — Gregory P. Brown; Brooks Kushman P.C.

(57) ABSTRACT

A memory of a privacy server stores user data and user settings. A processor of the privacy server is programmed to receive user settings corresponding to a user of a journey planning application; receive user data from vehicles and mobility services; manage the user data of the user according to the user settings; and provide information to the journey planning application explaining benefits of the sharing of the user data. A mobile computing device receives responses to a set of questions unrelated to sharing of user data for determining settings, identifies user settings defining the sharing of user data consistent with data indicative of user settings of users who answered the questions in the same manner, and displays terms of service for the sharing of user data based on the user settings.

10 Claims, 18 Drawing Sheets

(56) References Cited

U.S. PATENT DOCUMENTS

| | | | |
|---|---|---|---|
| 5,961,593 A | 10/1999 | Gabber et al. |
| 6,141,760 A | 10/2000 | Abadi et al. |
| 6,148,342 A | 11/2000 | Ho |
| 6,154,738 A | 11/2000 | Call |
| 6,182,141 B1 | 1/2001 | Blum et al. |
| 6,185,573 B1 | 2/2001 | Angelucci et al. |
| 6,253,203 B1 | 6/2001 | O'Flaherty et al. |
| 6,263,362 B1 | 7/2001 | Donoho et al. |
| 6,275,824 B1 | 8/2001 | O'Flaherty et al. |
| 6,278,904 B1 | 8/2001 | Ishii |
| 6,308,203 B1 | 10/2001 | Itabashi et al. |
| 6,327,574 B1 | 12/2001 | Kramer et al. |
| 6,335,927 B1 | 1/2002 | Elliott et al. |
| 6,356,936 B1 | 3/2002 | Donoho et al. |
| 6,401,125 B1 | 6/2002 | Makarios et al. |
| 6,418,441 B1 | 7/2002 | Call |
| 6,484,010 B1 | 11/2002 | Sheehan |
| 6,484,149 B1 | 11/2002 | Jammes et al. |
| 6,496,855 B1 | 12/2002 | Hunt et al. |
| 6,614,929 B1 | 9/2003 | Yokota |
| 6,688,889 B2 | 2/2004 | Wallace et al. |
| 6,704,787 B1 | 3/2004 | Umbreit |
| 6,808,392 B1 | 10/2004 | Walton |
| 6,832,321 B1 | 12/2004 | Barrett |
| 6,886,101 B2 | 4/2005 | Glazer et al. |
| 6,941,472 B2 | 9/2005 | Moriconi et al. |
| 6,959,420 B1 | 10/2005 | Mitchell et al. |
| 7,043,497 B1 | 5/2006 | Carty et al. |
| 7,054,648 B2 | 5/2006 | Abtin et al. |
| 7,076,558 B1 | 7/2006 | Dunn |
| 7,107,447 B2 | 9/2006 | Sanin et al. |
| 7,120,695 B2 | 10/2006 | Nilsson et al. |
| 7,123,613 B1 | 10/2006 | Chawla et al. |
| 7,213,258 B1 | 5/2007 | Kesarwani et al. |
| 7,225,460 B2 | 5/2007 | Barzilai et al. |
| 7,269,853 B1 | 9/2007 | Dunn |
| 7,275,260 B2 | 9/2007 | de Jong et al. |
| 7,299,410 B2 | 11/2007 | Kays et al. |
| 7,305,432 B2 | 12/2007 | Feng et al. |
| 7,370,015 B2 | 5/2008 | Gvily |
| 7,584,499 B2 | 9/2009 | Lee et al. |
| 7,653,936 B2 | 1/2010 | Oberst |
| 7,797,726 B2 | 9/2010 | Ashley et al. |
| 7,844,717 B2 | 11/2010 | Herz et al. |
| 7,877,494 B2 * | 1/2011 | Carlton .............. G06F 21/6263 709/228 |
| 7,920,050 B2 | 4/2011 | Juels et al. |
| 7,984,169 B2 | 7/2011 | Brunell et al. |
| 8,016,680 B1 | 9/2011 | Hutter et al. |
| 8,033,831 B2 | 10/2011 | Julia et al. |
| 8,052,426 B2 | 11/2011 | Snyder et al. |
| 8,135,621 B2 | 3/2012 | Vishik et al. |
| 8,229,116 B2 | 7/2012 | Ogata |
| 8,316,451 B2 | 11/2012 | Torres et al. |
| 8,392,822 B2 | 3/2013 | Hungerford et al. |
| 8,526,405 B2 | 9/2013 | Curtis et al. |
| 8,561,185 B1 | 10/2013 | Muthusrinivasan et al. |
| 8,641,424 B2 | 2/2014 | Soldavini et al. |
| 8,753,200 B1 | 6/2014 | Supanc et al. |
| 8,832,567 B1 | 9/2014 | Jing et al. |
| 8,839,454 B2 | 9/2014 | Krishnamurthy |
| 8,984,650 B2 | 3/2015 | Hughes et al. |
| 9,154,465 B2 | 10/2015 | Benedetti et al. |
| 9,355,272 B2 | 5/2016 | Jin |
| 9,369,417 B2 | 6/2016 | Nagayama |
| 9,369,471 B2 | 6/2016 | Zent et al. |
| 9,489,685 B2 | 11/2016 | Menn |
| 9,542,573 B2 | 1/2017 | Hughes et al. |
| 9,651,391 B1 * | 5/2017 | Hayes .............. G06Q 30/0255 |
| 2002/0029201 A1 | 3/2002 | Barzilai et al. |
| 2002/0104015 A1 | 8/2002 | Barzilai et al. |
| 2002/0122060 A1 | 9/2002 | Markel |
| 2002/0143770 A1 | 10/2002 | Schran et al. |
| 2002/0160347 A1 | 10/2002 | Wallace et al. |
| 2002/0165912 A1 | 11/2002 | Wenocur et al. |
| 2002/0174073 A1 | 11/2002 | Nordman et al. |
| 2002/0174364 A1 | 11/2002 | Nordman et al. |
| 2002/0188572 A1 | 12/2002 | Bleizeffer et al. |
| 2003/0023451 A1 | 1/2003 | Willner et al. |
| 2003/0080997 A1 | 5/2003 | Fuehren et al. |
| 2003/0084300 A1 | 5/2003 | Koike |
| 2003/0097383 A1 | 5/2003 | Smirnov et al. |
| 2003/0115484 A1 | 6/2003 | Moriconi et al. |
| 2003/0195759 A1 | 10/2003 | Glassco et al. |
| 2003/0204445 A1 | 10/2003 | Vishik et al. |
| 2004/0009461 A1 | 1/2004 | Snyder et al. |
| 2004/0078593 A1 | 4/2004 | Hind et al. |
| 2004/0083229 A1 | 4/2004 | Porter |
| 2004/0133625 A1 | 7/2004 | Plessmann |
| 2004/0199782 A1 | 10/2004 | Arnold |
| 2004/0210770 A1 | 10/2004 | Sanin et al. |
| 2004/0268146 A1 | 12/2004 | Oberst |
| 2005/0022006 A1 | 1/2005 | Bass et al. |
| 2005/0060221 A1 | 3/2005 | Kolar et al. |
| 2005/0091101 A1 | 4/2005 | Epling et al. |
| 2005/0172120 A1 | 8/2005 | Wang et al. |
| 2005/0198131 A1 | 9/2005 | Appelman et al. |
| 2005/0283443 A1 | 12/2005 | Hardt |
| 2006/0005227 A1 | 1/2006 | Samuelsson et al. |
| 2006/0031505 A1 | 2/2006 | Ashley |
| 2006/0075114 A1 | 4/2006 | Panasyuk et al. |
| 2006/0230432 A1 | 10/2006 | Lee et al. |
| 2006/0257841 A1 | 11/2006 | Mangano |
| 2006/0280191 A1 | 12/2006 | Nishida et al. |
| 2007/0045400 A1 | 3/2007 | Brown et al. |
| 2007/0274489 A1 | 11/2007 | Yamamura et al. |
| 2007/0292826 A1 | 12/2007 | Goddy et al. |
| 2008/0040370 A1 | 2/2008 | Bosworth et al. |
| 2008/0155013 A1 | 6/2008 | Morris |
| 2008/0155024 A1 | 6/2008 | Morris |
| 2008/0189761 A1 | 8/2008 | Brodie et al. |
| 2008/0235336 A1 | 9/2008 | Stern et al. |
| 2008/0235609 A1 | 9/2008 | Carraher et al. |
| 2009/0075709 A1 | 3/2009 | Park |
| 2009/0100498 A1 | 4/2009 | Grossi et al. |
| 2009/0170058 A1 | 7/2009 | Walker et al. |
| 2009/0172171 A1 | 7/2009 | Amir |
| 2009/0197237 A1 | 8/2009 | Couch et al. |
| 2009/0320090 A1 | 12/2009 | Hungerford et al. |
| 2009/0320091 A1 | 12/2009 | Torres et al. |
| 2010/0024028 A1 | 1/2010 | Baugher et al. |
| 2010/0036884 A1 | 2/2010 | Brown |
| 2010/0100824 A1 | 4/2010 | Bartolini et al. |
| 2010/0143873 A1 | 6/2010 | Keim et al. |
| 2010/0145947 A1 * | 6/2010 | Kolman .............. G06F 17/3087 707/736 |
| 2010/0293598 A1 | 11/2010 | Collart et al. |
| 2011/0039242 A1 | 2/2011 | Packard et al. |
| 2011/0072039 A1 | 3/2011 | Tayloe |
| 2011/0072142 A1 | 3/2011 | Herz et al. |
| 2011/0099202 A1 | 4/2011 | Dedeoglu et al. |
| 2011/0177480 A1 | 7/2011 | Menon et al. |
| 2011/0189643 A1 | 8/2011 | Hutchinson et al. |
| 2011/0195389 A1 | 8/2011 | DeYoung et al. |
| 2011/0197263 A1 | 8/2011 | Stinson, III |
| 2011/0208668 A1 | 8/2011 | Phillips |
| 2011/0255688 A1 | 10/2011 | Spalink et al. |
| 2012/0040326 A1 | 2/2012 | Larson-Rutter et al. |
| 2012/0110052 A1 | 5/2012 | Smarr et al. |
| 2012/0215878 A1 | 8/2012 | Kidron |
| 2012/0227115 A1 | 9/2012 | Kidron |
| 2012/0231438 A1 | 9/2012 | Fakhrai |
| 2012/0311131 A1 * | 12/2012 | Arrasvuori .......... G06F 21/6245 709/224 |
| 2012/0311657 A1 | 12/2012 | Boldyrev et al. |
| 2013/0014279 A1 | 1/2013 | Leland |
| 2013/0018812 A1 | 1/2013 | Cherner et al. |
| 2013/0024060 A1 * | 1/2013 | Sukkarie .............. G01C 21/26 701/22 |
| 2013/0282843 A1 | 10/2013 | Nagayama |
| 2013/0310166 A1 | 11/2013 | Higgins et al. |
| 2014/0024009 A1 | 1/2014 | Nealon et al. |
| 2014/0283101 A1 | 9/2014 | Jin |
| 2014/0310729 A1 | 10/2014 | Chaniotakis et al. |

(56) References Cited

U.S. PATENT DOCUMENTS

| | | |
|---|---|---|
| 2015/0026598 A1 | 1/2015 | Ho |
| 2015/0066940 A1 | 3/2015 | Fernandes et al. |
| 2015/0101022 A1 | 4/2015 | Zent et al. |
| 2015/0119120 A1 | 4/2015 | Spagnola |
| 2015/0150074 A1* | 5/2015 | Nolan ................. G06F 19/3418 726/1 |
| 2015/0150144 A1 | 5/2015 | Hughes et al. |
| 2015/0179078 A1 | 6/2015 | Spagnola |
| 2015/0182843 A1* | 7/2015 | Esposito ........... G06K 9/00342 700/91 |
| 2015/0187223 A1 | 7/2015 | Kapoor et al. |
| 2015/0286836 A1 | 10/2015 | Menn |
| 2016/0033289 A1* | 2/2016 | Tuukkanen ........ G01C 21/3415 701/522 |
| 2016/0132695 A1* | 5/2016 | Duffy ................. G06F 21/6245 726/30 |
| 2016/0171637 A1* | 6/2016 | Rai ........................ H04L 67/12 705/13 |
| 2016/0307041 A1* | 10/2016 | Biswas ............. G06F 17/30241 |
| 2016/0321566 A1* | 11/2016 | Liu ........................ G06Q 10/02 |
| 2016/0358214 A1* | 12/2016 | Shalunov ........... G06Q 30/0241 |
| 2016/0364823 A1* | 12/2016 | Cao ......................... G06Q 50/30 |
| 2017/0098284 A1* | 4/2017 | Schneider .............. G06Q 50/01 |
| 2017/0115126 A1* | 4/2017 | McMaster .......... G01C 21/3492 |
| 2017/0116552 A1* | 4/2017 | Deodhar .......... G06Q 10/06316 |
| 2017/0215031 A1* | 7/2017 | Harding ............... G01C 21/362 |
| 2018/0053200 A1* | 2/2018 | Cronin ............... G06Q 30/0208 |

FOREIGN PATENT DOCUMENTS

| | | |
|---|---|---|
| DE | 102012218575 A1 | 4/2013 |
| EP | 0990972 A1 | 4/2000 |
| EP | 0991005 A2 | 4/2000 |
| EP | 0992924 A2 | 4/2000 |
| EP | 1081916 A2 | 3/2001 |
| EP | 1089196 A2 | 4/2001 |
| EP | 1089200 A2 | 4/2001 |
| EP | 1223757 A2 | 7/2002 |
| EP | 1850263 A1 | 10/2007 |
| GB | 2495797 A | 4/2013 |
| WO | 2001045022 A2 | 6/2001 |
| WO | 2002020498 A2 | 3/2002 |
| WO | 0235314 A2 | 5/2002 |

* cited by examiner

Building a Better World Together

For over 100 years, Ford Motor Company has been building cars in the spirit Henry Ford's original vision of providing affordable, safe transportation to everyone. Today, Ford is realizing the vision by incorporating state-of-the-art technology into our products and services to improve quality, minimize environmental impact, and make them safer and more enjoyable to drive, own, and use. With the information you share with use, including from your vehicle and devices, we can improve your experience while building a safer, cleaner, better world together.

Watch the video to learn more, or click on an icon below to learn more about our information management practices.

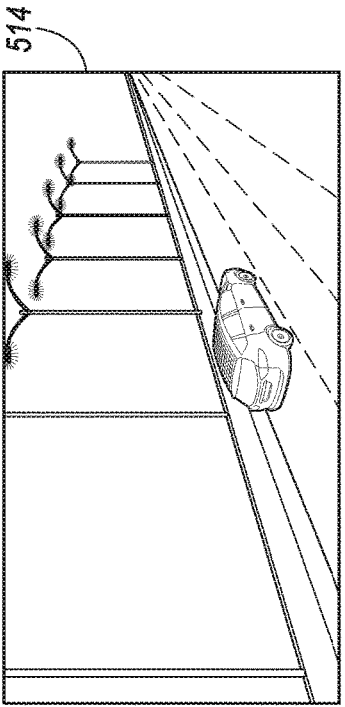

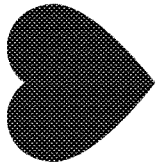
Information
What types of information do we manage for you?

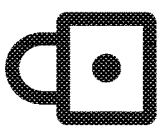
Use
How do we use information to help you?

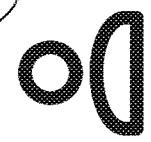
My Profile
How can you control what information is gathered and how it is used?

Security
How do we safeguard your information?

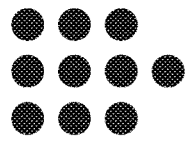
Our Commitment
Understand our commitment to you to manage information responsibly?

FIG. 5B

What types of information do we manage for you?

MANAGING INFORMATION TO BUILD A BETTER WORLD

From Connected Services to repair services, Ford manages all of the information we gather from you, your vehicle and devices, and from our dealers and others to give you a best-in-class customer experience.

Watch the video and click below to learn more.

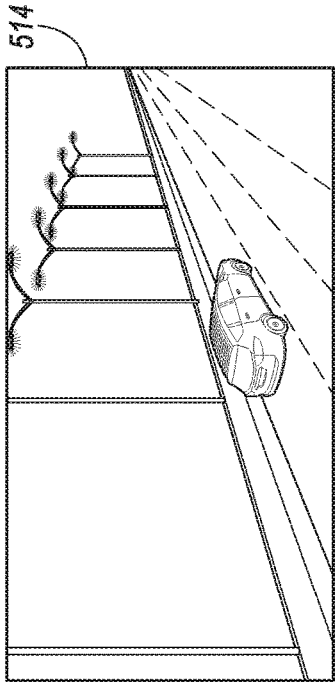

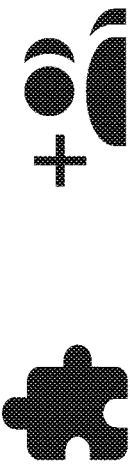

Vehicle Information
We manage information from your vehicle to deliver features you love.

Device Information
When you use our website, apps, and other services, Ford manages information from your devices to deliver and improve services.

Information You Share
You may choose to share information with Ford when you create or modify an account, request services, contract customer support, or otherwise communicate within.

Information We Get From Dealers and Third Parties
We may combine information you give us with other information from Ford affiliated companies, dealers, and others.

Information We Share With Others
How do we share information?

FIG. 5C

What types of vehicle information do we manage for you?

TOGETHER WE CAN GO FURTHER WITH VEHICLE INFORMATION

Not only is Ford using your vehicle information to make your life easier, but your vehicle information is helping us change the world. By understanding things like how and where you drive, together we can discover ways to reduce traffic congestion and pollution, increase fuel economy, and preserve our natural resources.

Watch the video and click below to learn more.

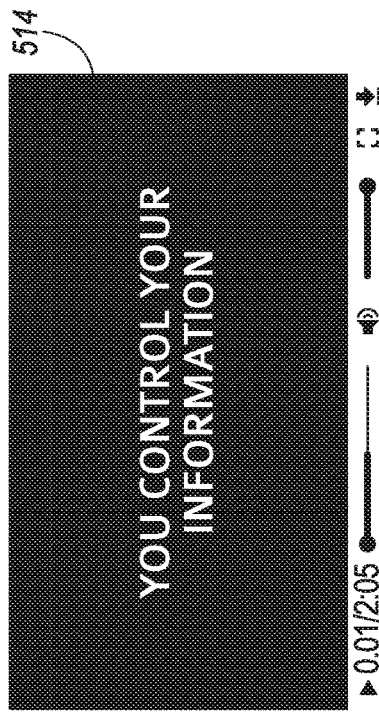

Telematics and Dianostics
We manage information from your vehicle to understand how your vehicle is performing.

In-Vehicle Services
We manage information to understand how features operate in the cabin.

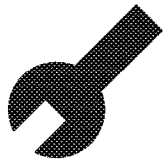

Authorized Service and Repair
We manage information about repairs and services performed on your vehicle.

Information Use
How do we use information to help you?

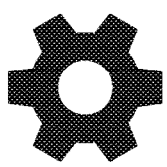

My Profile
How can you control what information is gathered and how it is used?

FIG. 5D

PORTABLE PRIVACY MANAGEMENT

TECHNICAL FIELD

Aspects of the disclosure generally relate to a portable privacy management for the collection and providing of user data, as well as for the providing of information encouraging the user to share greater amounts of user data.

BACKGROUND

When a user accesses an information system, data about that user may be collected. The collected user data may include account information, such as a name or credit card number, or other user information such as a purchase history or location history. The user data is stored in information technology systems that utilize technical measures to secure information such that it is only available to authorized parties. There are situations where a user may benefit from the sharing of his or her personal information, but it may be the case that the user's settings disallow such sharing.

For the World Wide Web (WWW), the World Wide Web Consortium (W3C) provides a platform for privacy preferences project (P3P) to enable websites to express their privacy practices in a standard format that can be retrieved automatically and interpreted easily by user agents. P3P user agents allow users to be informed of site practices (in both machine and human-readable formats) and to automate decision-making based on these practices when appropriate. Thus, users need not read the privacy policies at every site he or she visits.

For mobile devices, a personalized privacy assistant (PPA) for mobile application permissions has been created to allow mobile permission management of mobile applications that request permissions to access private data and resources. The PPA utilizes learned privacy profiles compiled from clusters of like-minded users which are used to recommend mobile application permission settings that users are likely to adopt. Following an initial recommendation on permission settings, users are motivated to further review and modify their settings with daily "privacy nudges." Further information is available in the paper titled "Follow My Recommendations: A Personalized Privacy Assistant for Mobile App Permissions," included in the Proceedings of the Twelfth Symposium on Usable Privacy and Security.

For social networks, U.S. Pat. No. 8,832,567 states that establishing privacy settings associated with user data shared by a user of a social networking service can include transmitting instructions to display a graphical user interface (GUI) that includes two or more privacy zones: a first privacy zone that is representative of a first set of privacy settings and a second privacy zone that is representative of a second set of privacy settings. The GUI can include a privacy setting icon that is representative of one or more social entities. User input can be received to define placement of the privacy setting icon within one of the first and second privacy zones. In response to placement of the privacy setting icon, one of the first set of privacy settings and the second set of privacy settings are assigned to the one or more social entities represented by the privacy setting icon.

SUMMARY

A system includes a memory of a privacy server storing user data and user settings. The system further includes a processor of the privacy server programmed to receive user settings corresponding to a user of a journey planning application; receive user data from vehicles and mobility services; manage sharing of the user data of the user according to the user settings; and provide information to the journey planning application explaining benefits of the sharing of the user data.

A computing device includes a processor programmed to execute a journey planning application to receive responses to a set of questions unrelated to sharing of user data, identify user settings defining the sharing of user data consistent with those of users who answered the questions in the same manner, and display terms of service for the sharing of user data based on the user settings.

A non-transitory computer readable medium includes instructions of an application that, when executed by a processor of a mobile device, cause the mobile device to determine user settings for sharing of user data for a user account; display, responsive to passage of a predefined time period, a check-in interface to provide a status update including a snapshot of benefits that were achieved through the sharing of user data; and explain additional benefits available were the user setting to further allow for sharing of additional user data.

BRIEF DESCRIPTION OF THE DRAWINGS

FIG. 5B illustrates an example top-level of hierarchical terms and conditions for the system;

FIG. 5C illustrates an example of an information subcategory of the hierarchical terms and conditions for the system;

FIG. 5D illustrates an example of a vehicle information subcategory of the information subcategory of hierarchical terms and conditions for the system;

DETAILED DESCRIPTION

As the automotive market transitions from vehicle manufacturers to mobility companies providing transportation products and services, customers may face privacy challenges with data collection and use. For instance, current systems may include multiple opt-in touchpoints across applications, websites, and devices with different terms. As another example, existing systems can include user interfaces that could provide users with more control over privacy choices and greater explanation of the benefits of sharing data.

Centralized privacy management functionality allows for privacy choices to be managed intuitively, allowing customers to seamlessly interact with mobility products and systems. In doing so, the management provides safeguards to protect customer data, customer controls for ongoing control of their data, transparency regarding how the customer data is used, and indications of value in return for use of the customer data.

To implement a centralized privacy system, a user data server may serve as a collection point for user data of users of the system. The user data server may utilize user settings to determine what privacy information may be provided to mobility or other journey-planning services. Moreover, as the user data server is the collector of the data, the user data server may be able to perform analysis of the user data from a uniquely-informed perspective, regardless of the sharing of the user data to third-party services.

A journey planning application may be installed to a user's mobile device. Using the journey planning application, the user may be able to globally set up his or her privacy settings for sharing of data with mobility or other journey-planning services. Additionally, the journey planning application may provide the user with information indicating the benefits of sharing of the user data. By indicating the benefits of the sharing of user data, the journey planning application may encourage the user to share more data, improving the overall user experience of the user. Further aspects of the disclosure are discussed in detail below.

Figure 1:
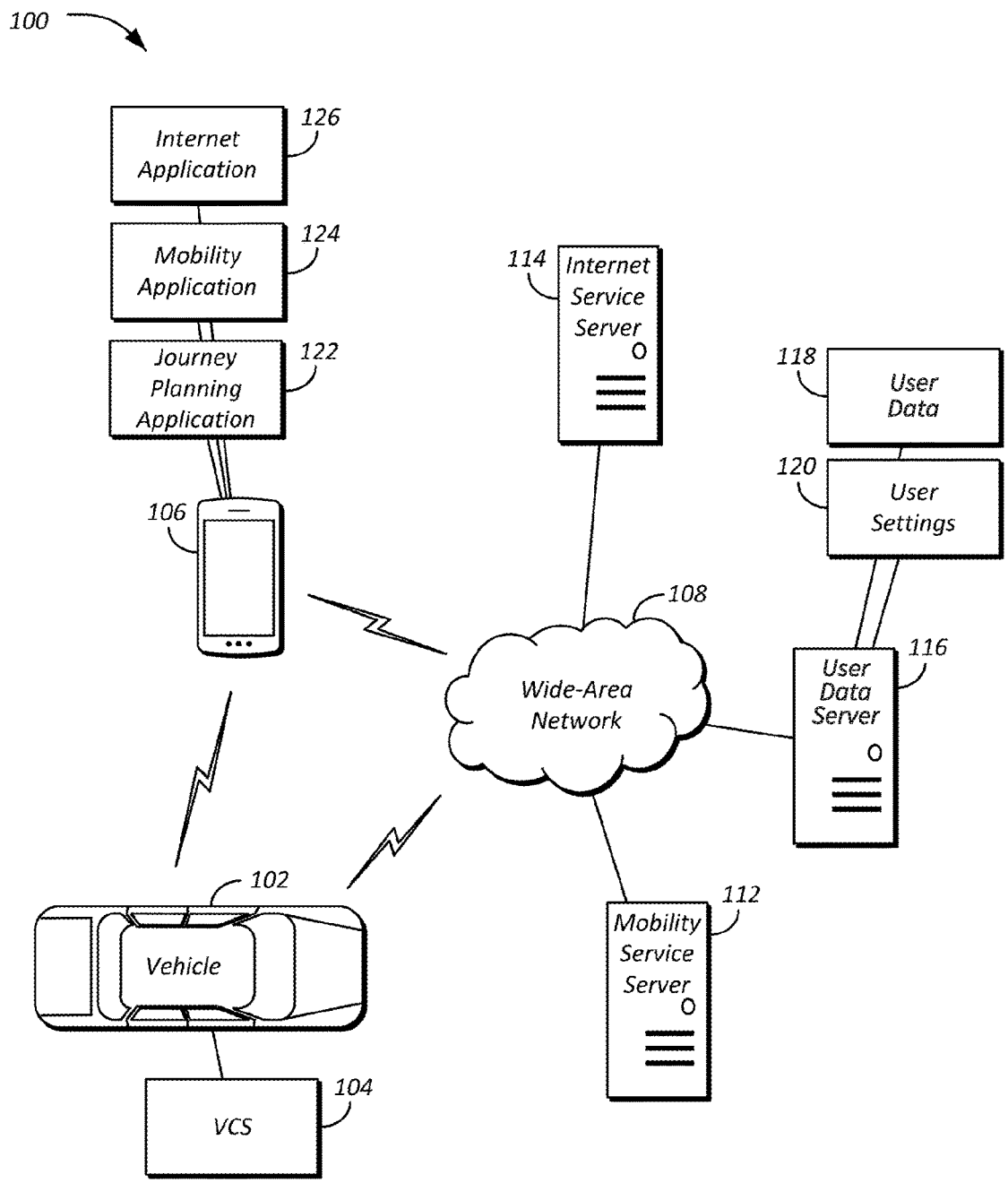
FIG. 1 illustrates an example system for providing portable privacy management.

FIG. 1 illustrates an example system 100 for providing portable privacy management. As shown, the system 100 includes a vehicle 102 having a vehicle computing system (VCS) 104 configured to communicate over a wide-area network 108, e.g., using a telematics control unit (TCU). The system 100 also includes a mobility service server 112 configured to provide for ride-sharing or other mobility services, and an internet service server 114 configured to provide for online purchases or other non-mobility services. A mobile device 106 of the system is configured to utilize a mobility application 124 to utilize the services of the mobility service server 112, and an internet application 126 to utilize the services of the internet service server 114. The system 100 also includes a user data server 116 configured to maintain user data 118 of users of the system and user settings 120 relating to the availability of the user data 118 to other devices such as the mobility service server 112 or the internet service server 114. Through use of a journey planning application 122 stored to the mobile device 106, the user may manage the user data 118 and user settings 120, as well as understand the value of careful use of the user data 118 in improving the user's overall journey experience. While an example system 100 is shown in FIG. 1, the example components as illustrated are not intended to be limiting. Indeed, the system 100 may have more or fewer components, and additional or alternative components and/or implementations may be used. As one possibility, the system 100 may include more or fewer mobility service servers 112 or internet service servers 114. As another possibility, the system 100 may include multiple user data servers 116 each assigned to one of various regions or subsets of data.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, the vehicle 102 may have different capabilities with respect to passenger capacity, towing ability and capacity, and storage volume.

The VCS 104 may be configured to support voice command and BLUETOOTH interfaces with the driver and carry-on devices, receive user input via various buttons or other controls, and provide vehicle status information to a driver or other vehicle 102 occupants. An example VCS 104 may be the SYNC system provided by FORD MOTOR COMPANY of Dearborn, Mich.

The VCS 104 may further include various types of computing apparatus in support of performance of the functions of the VCS 104 described herein. In an example, the VCS 104 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The VCS 104 may be configured to communicate with mobile devices 106 of the vehicle occupants. The mobile devices 106 may be any of various types of portable computing devices, such as cellular phones, tablet computers, smart watches, laptop computers, portable music players, or other devices capable of communication with the VCS 104. As with the VCS 104, the mobile device 106 may include one or more processors configured to execute computer instructions, and a storage medium on which the computer-executable instructions and/or data may be maintained. In many examples, the VCS 104 may include a wireless transceiver (e.g., a BLUETOOTH controller, a ZIGBEE transceiver, a Wi-Fi transceiver, etc.) configured to communicate with a compatible wireless transceiver of the mobile device 106. Additionally, or alternately, the VCS 104 may communicate with the mobile device 106 over a wired connection, such as via a USB connection between the mobile device 106 and a USB subsystem of the VCS 104.

The wide-area network 108 may include one or more interconnected communication networks such as the Internet, a cable television distribution network, a satellite link network, a local area network, a wide area network, and a telephone network, as some non-limiting examples.

Each of the mobility service server 112, the internet service server 114, and the user data server 116 may include various types of computing apparatus, such as a computer workstation, a server, a desktop computer, a virtual server instance executed by a mainframe server, or some other computing system and/or device. Similar to the VCS 104, each of the mobility service server 112, the internet service server 114, and the user data server 116 generally includes a memory on which computer-executable instructions may be maintained, where the instructions may be executable by one or more processors (not shown for clarity). Such instructions and other data may be stored using a variety of computer-readable media.

The mobility service server 112 may maintain a mobility service. The mobility service may facilitate the transportation of the user traversing a journey from one point to another. In some examples, the mobility service may be a ride-share service, a car-sharing service, a car rental or ownership service, a bus, a train, or other mass transit service, or a bike rental service. In many cases the mobility service server 112 may be operated under the control of a mobility service entity, rather than under the control of the manufacturer or operator of the vehicles 102.

In some cases, multiple mobility service components may be integrated into a mobility ecosystem providing common functionality across the multiple mobility services. This functionality may include, for example, a uniform interface for communication between mobility services. In one example, a local government or other agency may maintain the mobility ecosystem or a portion of the mobility ecosystem into which individual mobility services may fit. For instance, a city may integrate a set of ride-sharing and car-sharing mobility services through a transportation operating system defining a programming interface exposed by the mobility service server 112 and providing rules for accessing the operating system. Services that choose to interact with one of the mobility services (e.g., with an airline or a train station), or to integrate new functionality into the overall ecosystem (e.g., a new bus service), may accordingly access the functionality of the mobility service server 112 via the uniform interface.

Each mobility service may include instructions that, when executed by a processor of the mobility service server 112, cause the mobility service server 112 to connect customers with drivers or vehicles that provide rides, as well as facilitate payment by the user for the mobility services. In many examples, the user may access the mobility service server 112 using a mobility application 124 installed to the user's mobile device 106. When executed by the mobile device 106, the mobility application 124 may allow the user to request the mobility ride or vehicle share, receive status updates regarding the progress of the mobility service, and authorize payment of the mobility service.

The internet service server 114 may maintain an internet service. In some examples, the internet service may include a streaming music provider such as SPOTIFY, an online retailer such as AMAZON, or a brick-and-mortar retailer with an online presence such as STARBUCKS coffee, a florist, or a clothing dry cleaner. In many cases, the internet service server 114 may be operated under the control of the internet service, rather than under the control of the mobility service, manufacturer, or operator of the vehicles 102.

The internet service may include instructions that, when executed by a processor of the internet service server 114, cause the internet service server 114 to receive requests for goods or services from a user, provide the requested good or service, and facilitate payment for the goods or services. In many examples, the user may access the internet service server 114 using an internet application 126 installed to the user's mobile device 106. When executed by the mobile device 106, the internet application 126 may allow the user to select a product or service (e.g., a product to be delivered, media content to be streamed to the user, etc.) receive status updates regarding the progress of the internet service (e.g., shipping time), and authorize payment of the mobility service (e.g., one-click billing, monthly subscription, etc.).

The user data server 116 may maintain a data management service collecting and managing the user data 118. In an example, the data management service may be operated under the control of the manufacturer of the vehicle 102. In other examples, the data management service may be controlled by an entity separate from the manufacturer of the vehicle 102. In some examples, the user data server 116 may further be configured to interact with the uniform interface of the mobility ecosystem to provide data management services at an ecosystem level, rather than via separate connection to each of the services of the mobility ecosystem.

The user data 118 may include various information personal to the user that is personally-identifiable or otherwise sensitive that is collected, stored, used, or deleted. In an example, the user data 118 may include data captured by the VCS 104 of the vehicle 102 and sent to the user data server 116. In some other examples, user data 118 may include data captured by the mobile device 106, data captured by network entities in communication with the vehicle 102 or mobile device 106, or data captured during other user interactions with data management systems that can be linked to the user. The user data 118 may also include user profile information, such as credit card numbers, names and addresses of the user, and the like.

In many cases, the user data 118 is generated and stored by computing systems when facilitating the performance of other services for the user. In an example, a ride-sharing mobility service may utilize geographic position information relating to the location of the user to facilitate the sharing of a ride or vehicle with the user. In another example, a streaming media internet service may utilize a history of previously-accessed media to suggest additional media for the user to consume. In yet a further example, a seller of goods over the internet may utilize a history of complementary purchases by other users to suggest complementary purchases for a given user. The user data 118 may include biometric information relevant to authentication or service delivery.

The user settings 120 may include default selections or user selections that may be used by the system 100 to determine what user data 118 may be provided to what services for a given user account. In an example, the user settings may specify which of the mobility services and/or internet services can access which elements of user data 118.

In some cases, one or more of the mobility services or internet services may be an affinity partner of the data management service. For instance, one or more of the mobility services or internet services may be in a partnership with the vehicle manufacturer maintaining the data management service to bring together customers of the vehicle manufacturer to those of the mobility or internet service, and vice versa. The user settings 120 may include settings to be applied to affinity partners as well as settings to be applied to non-affinity partners. In an example, the affinity partners may have been vetted by the operator of the user data server 116 and, due to that vetting, may be authorized to utilize a default set of user settings 120 for affinity partners. In another example, the non-affinity partners may have settings that are set by the user, as those partners may have not been through the vetting process and may not be deemed to be trusted without user authorization. By having settings consistent across the affinity partners, a user may be able to allow the system 100 to utilize sensible defaults, without requiring the user to provide input for every interaction requiring user data 118.

In some examples, the user data 118 may be managed by the user data server 116 utilizing blockchain technology. In blockchain, information exists and is reconciled as a shared database, with no central data store. Instead, each record is stored as a "block", which contains record information, a timestamp, and a link to a previous block. As blocks cannot be changed once they are created, integrity of the stored user data 118 is assured.

For example, when a new user is created, a new identity is created and is added to the blockchain data store along with the user settings 120. User data 118 for the user may then be encrypted using one or more shared encryption keys and added to the blockchain. The key and also a pointer to the stored data (e.g., a SHA-256 hash of the data block) may then be stored by the user data server 116 outside of the blockchain. In other examples, the off-blockchain data store may be implemented as a distributed hash table, thereby providing for decentralization of the off-blockchain data as well.

Once stored, both the services and the user can query for the data using a data query transaction to the blockchain with the pointer (key) of the data to retrieve. The blockchain then verifies that the digital signature belongs to either the user or the service. For the service, its permissions to access the data are checked against the user settings 120. Additionally, the user can change the permissions granted to a service at any time by updating the user settings 120 with a new set of permissions, including revoking access to previously stored data. Accordingly, using permissions defined by user settings 120 incorporating keys used by the blockchain database, secured access by the services of the system 100 to the user data 118 may be assured via the blockchain protocol.

The journey planning application 122 may be a portal application installed to the mobile device 106 and offering various types of services. As some possibilities, the journey planning application 122 may offer vehicle 102 registration services, features for viewing maintenance records or scheduling maintenance for the registered vehicles 102, wallet services for storing financial information for use in purchases, parking location services, and vehicle 102 payment services. To perform these functions, the journey planning application 122 may require access to user data 118, as well as sharing of user data 118 with affinity partners or non-affinity partners. For instance, to book a ride-share, the journey planning application 122 may require access to credit card and geographic location information of the user. In some cases, the user may desire to make the user data 118 available to perform the requested functions. In other cases, the user may desire to keep the information private. However, there are situations where a user may benefit from the sharing of certain information, but the user has settings that prevent such sharing.

The journey planning application 122 may include data management services for the selective use of the user data 118 of the user. For instance, the journey planning application 122 may allow the user to configure the user settings 120 and review benefits to the user for the sharing of user data 118 according to the user settings 120. Further aspects of the setup and informational views are discussed below with respect to FIGS. 2-14.

Figure 2:
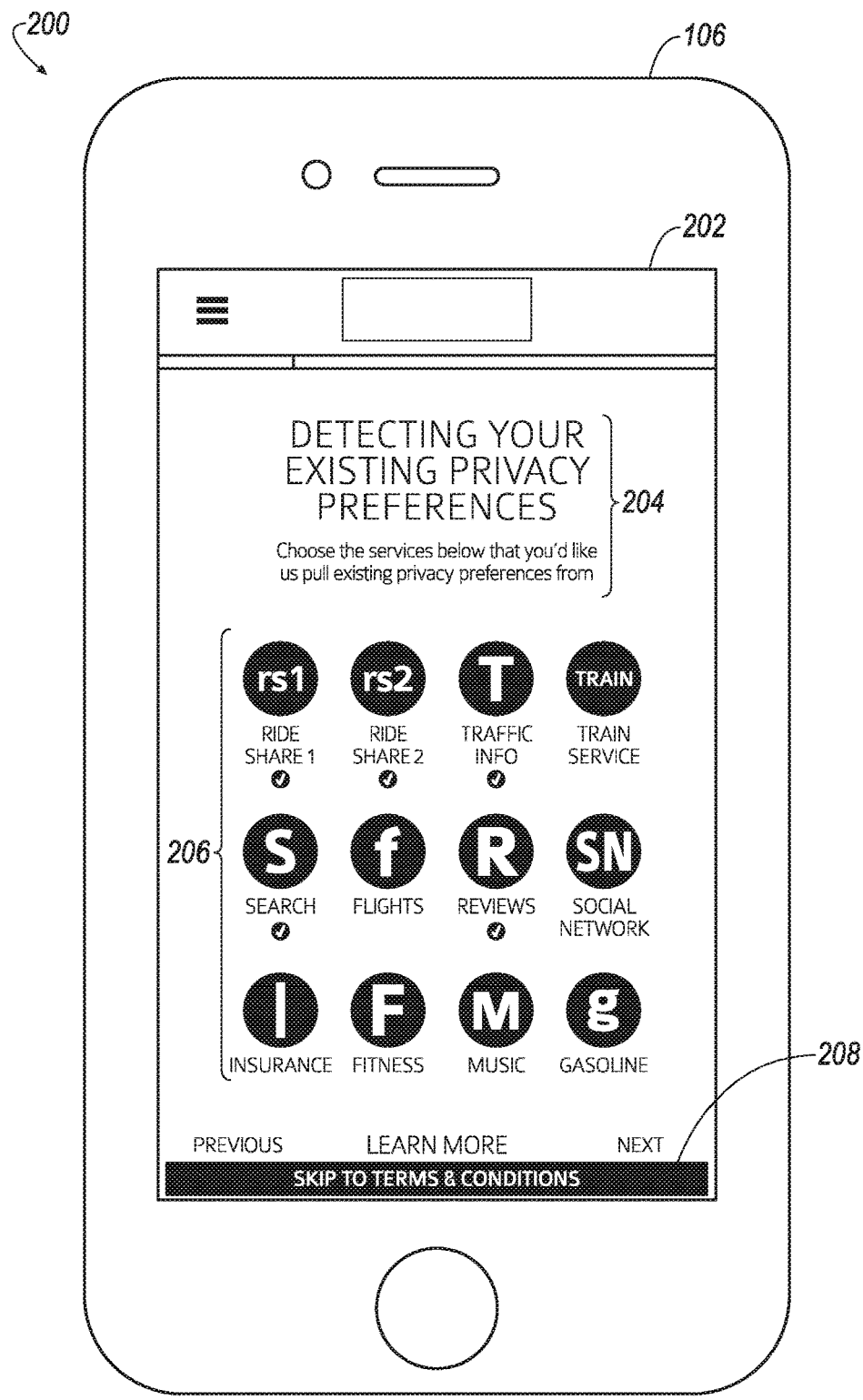
FIG. 2 illustrates an example of a user interface of the journey planning application for configuration of the user settings.

FIG. 2 illustrates an example 200 of a user interface 202 of the journey planning application 122 for configuration of the user settings 120. In an example, the user interface 202 may be displayed to a screen of the mobile device 106 upon initial configuration of the journey planning application 122. In another example, the user interface 202 may be displayed responsive to user selection of a settings option of the journey planning application 122. As shown, the user interface 202 includes informational text 204 to indicate to the user that the journey planning application 122 is attempting to set sensible defaults for the user settings 120 based on the current privacy settings of the mobility applications 124 or internet applications 126.

The user interface 202 also includes a set of indications of the currently-installed mobility applications 124 or internet applications 126 from which the user can select to import settings. For instance, this set of indications may include applications recognized by the journey planning application 122 as having settings relevant to user privacy. In an example, the journey planning application 122 may query the mobile device 106 for available applications that match a list of known applications having relevant user settings 120, and may list those applications that are a match. Based on the settings of the installed mobility applications 124 or internet applications 126, the journey planning application 122 can infer settings for the journey planning application 122. For instance, if the user allows location data to be shared with the selected ride-sharing and mapping applications, the journey planning application 122 can infer that sharing the user's location more generally is an appropriate default for the user settings 120. As another possibility, if the user allows purchase information to be shared to social networking applications installed to the mobile device 106, the journey planning application 122 can infer that sharing of purchase history with other internet applications 126 is acceptable to the user.

In another example, the user interface 202 may offer a set of "fun" questions to the user to guide the user into specifying the user settings 120. These questions may be designed to cause the user to think about the positive benefits of sharing the user data 118 to overcome a gut reaction of the user to refuse to share data that may actually be beneficial for the user to share. For instance, these questions may include "Do you want your mobility applications to inform you of deals in your area?" or "Do you want to receive suggestions of products to purchase based on your purchase history?"

In another example, these questions may be unrelated to the subject matter of data sharing. As some examples, these questions may include "Are you a little bit country or a little bit rock and roll?" "Do you prefer flats or pumps?" or "Are you a morning person?" Based on the preferred user settings 120 of other users who similarly answered these questions, the system may determine user settings 120 for the user. In an example, the journey planning application 122 may access training data of test users who were previously asked the questions that also include those users privacy settings. Thus, the user settings 120 may be determined based on a correlation of answers to questions unrelated to data sharing or privacy settings for those users. For instance, the user settings 120 may be identified as being consistent with those of users in the training data who answered the questions in the same manner.

The user interface 202 may also provide a terms of service control 208 that, when selected, allows the user to view the terms and conditions for use of the journey planning application 122. This, accordingly, allows the user to have a quick mechanism to review the terms and conditions at any time.

Figure 3:
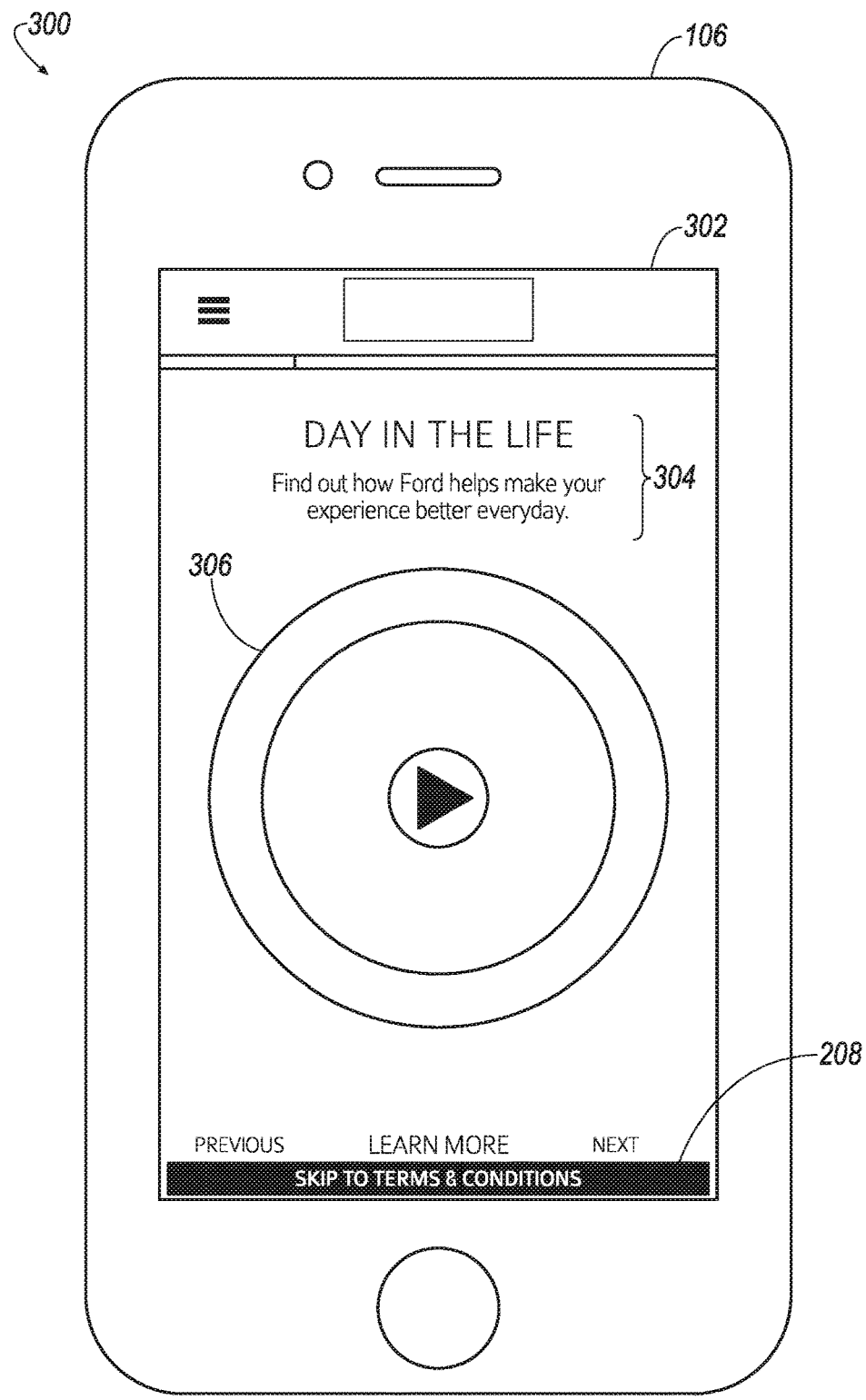
FIG. 3 illustrates an example of a user interface of the journey planning application for a "day in the life" feature.

FIG. 3 illustrates an example 300 of a user interface 302 of the journey planning application 122 for a "day in the life" feature. In an example, the day in the life feature may be displayed by the journey planning application 122 responsive to completion of setup of the user settings 120 via the user interface 202. The user interface 202 includes informational text 304 to indicate to the user that the journey planning application 122 is providing information explaining how use of the journey planning application 122 improves the user experience of the user for use of both mobility and non-mobility uses.

The user interface 302 further includes a video playback control 306 that is configured to play a video that highlights moments in which the system 100 uses user data 118 to enrich the user experience for the user. In an example, the video may be templated such that the user can move to topics such as an explanation of the benefits of using the system 100, relevant life moments in which the system 100 privacy functions are implicated, personalized experiences for the user based on the user settings 120 as initially set up, indications of who the affinity partners are for the system 100, and explanation of how the user performs further configuration of the system 100.

The user interface 302 may also provide a terms of service control 208 that, when selected, allows the user to view the terms and conditions for use of the journey planning application 122.

Figure 4:
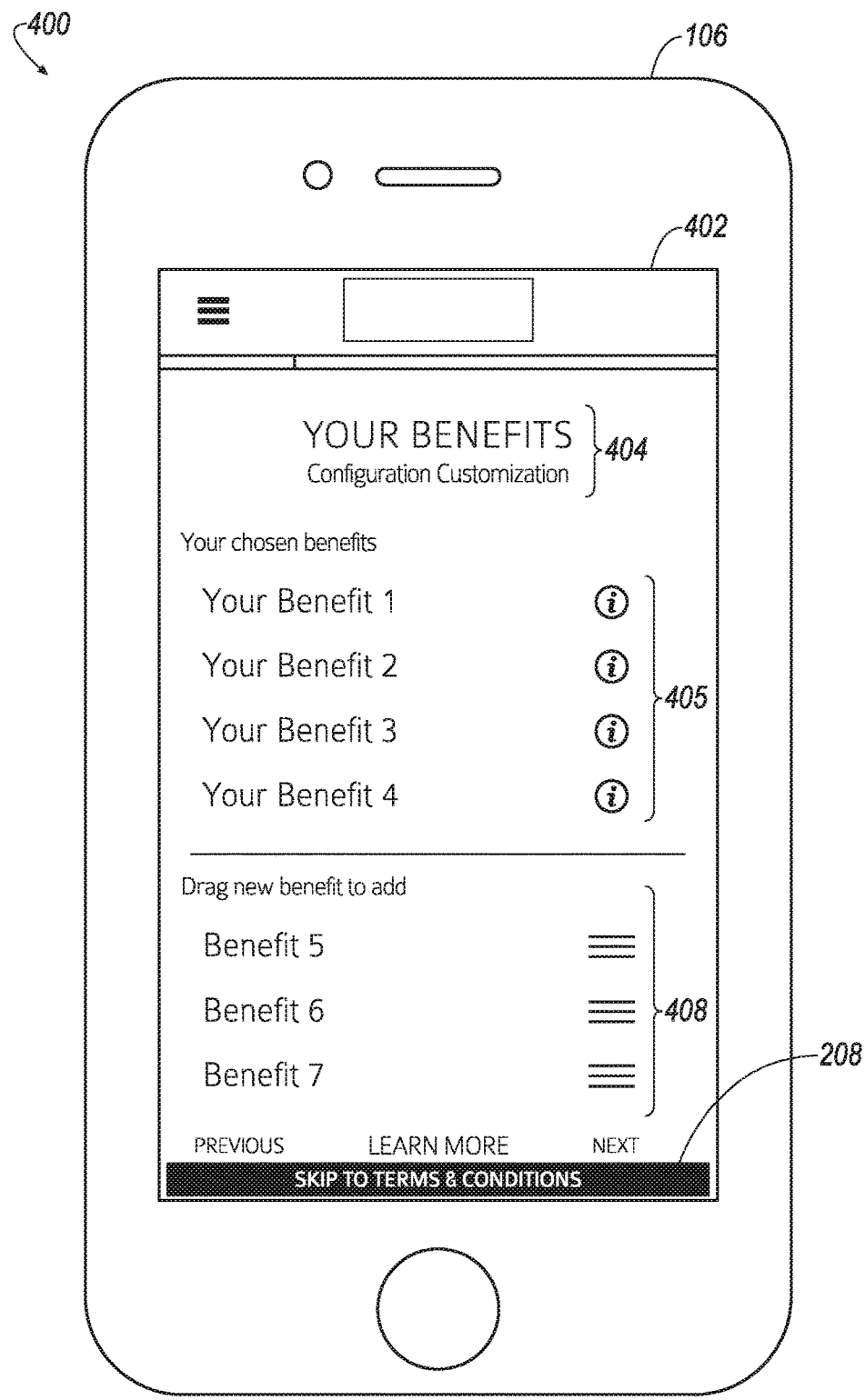
FIG. 4 illustrates an example of a user interface of the journey planning application for explaining benefits of using the journey planning application.

FIG. 4 illustrates an example 400 of a user interface 402 of the journey planning application 122 for explaining benefits of using the journey planning application 122. In an example, the benefits feature of the user interface 402 may be displayed by the journey planning application 122 responsive to completion of setup of the day in the life feature via the user interface 302. The user interface 402 includes informational text 404 to indicate to the user that the journey planning application 122 is providing an interface for the selection of benefits that are achievable if certain elements of user data 118 are shared by the user.

As shown, the user interface 402 includes a listing of benefits 406 chosen by the user, as well as a listing of available benefits 408 from which the user may select. Each of the benefits 406 is listed in positive language indicating one or more advantages that may be possible to the user were various aspects of the user data 118 shared. In an example, one scenario may include that if the user also shared his or her calendar and location, the journey planning application 122 could provide just-in-time arrival information of the user, or that a vehicle 102 dealer could propose an optimal day or time for an oil change based on the user's calendar. In another example, a scenario may include that if a calendar of the user is shared, the system 100 could combine events to optimize efficiency to save time or travel costs (e.g., by suggesting that dry cleaning could be picked up en route to a soccer game if the user left the house at a certain time).

If a user desires one of the benefits in the listing of available benefits 408, the user may use touch or other input to the mobile device 106 to drag that benefit into the listing of benefits 406. On the other hand, if the user no longer desires one of the benefits in the listing of benefits 406, the user may use touch or other input to the mobile device 106 to drag that benefit out of the listing of benefits 406 or into the listing of available benefits 408. Moreover, if the user desires additional information about one or more of the benefits, the user can select one of the benefits in either listing, which may cause the journey planning application 122 to provide further details of the elements of user data 118 requires to achieve the benefit and/or further discussion of the benefit itself.

The user interface 402 may also provide the terms of service control 208 that, when selected, allows the user to view the terms and conditions for use of the journey planning application 122.

Figure 5A:
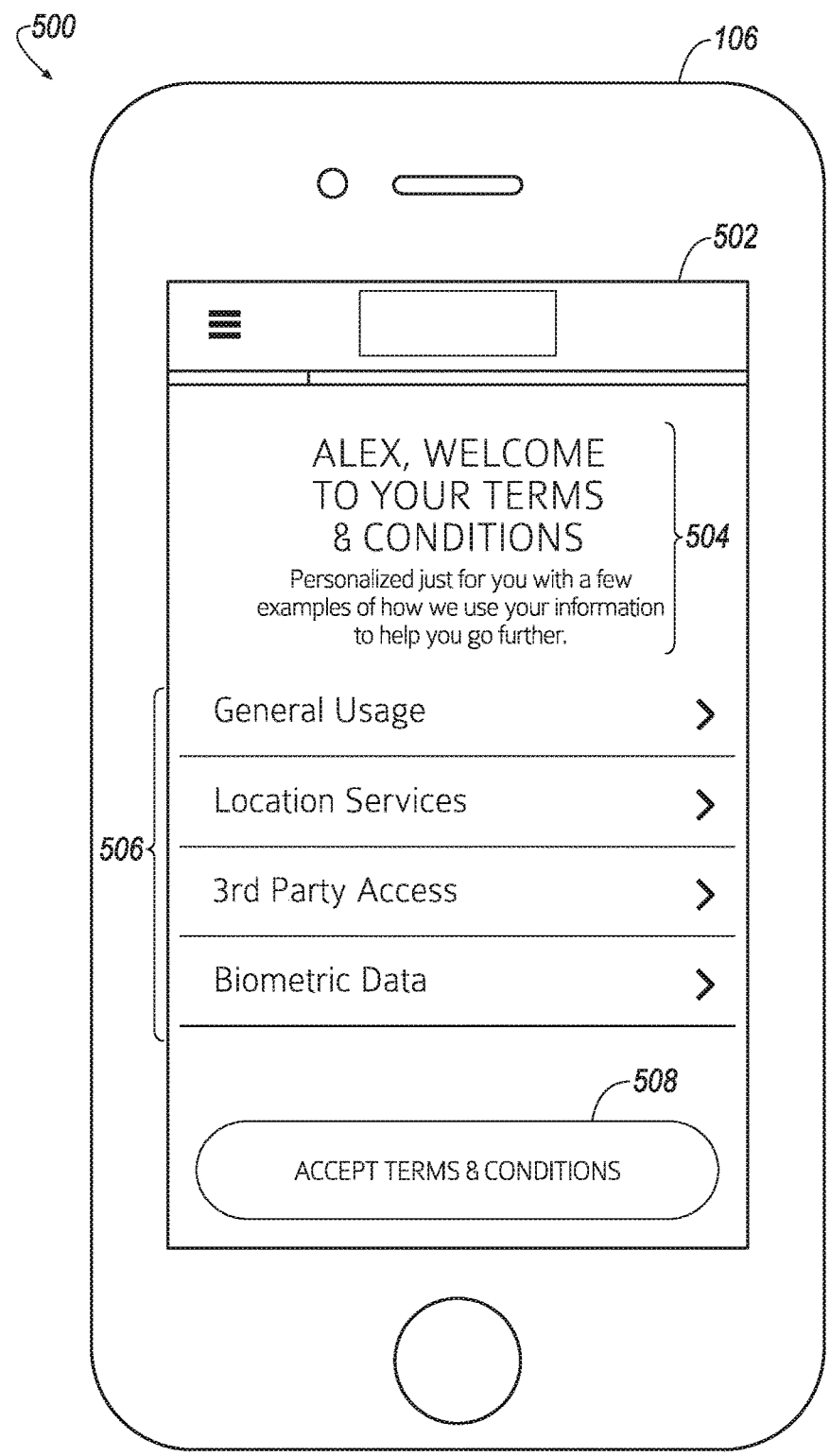
FIG. 5A illustrates an example of a user interface of the journey planning application for approving the terms and conditions.

FIG. 5A illustrates an example 500A of a user interface 502A of the journey planning application 122 for approving the terms and conditions. In an example, the terms and conditions feature user interface 502 may be displayed by the journey planning application 122 responsive to selection of the terms of service control 208.

As shown, the terms and conditions feature user interface 502 includes informational text 504 to indicate to the user that the journey planning application 122 is providing a view of the terms and conditions of the system 100, personalized to the choices for user settings 120 of the user. The personalization may be based on the user settings 120 determined as discussed above. In an example, a user willing to share geolocation data would see terms directly related to collection and use of geolocation data, while another user, whose profile did not permit sharing of geolocation, would not see geolocation terms. In another example, a user profile permitting marketing uses of data would see marketing terms, but a user not permitting such use would not. Thus, the user dictates the terms of the data sharing, not the journey planning application 122 or a service provider.

To show the terms in an intuitive way, the user interface 502 includes a categorized view of aspects of the terms and conditions. In an example, these categories may include a general usage, location services, third-party access, and biometric data, as some possibilities. The general usage section may specify high-level information about requirements that the user must accept to use the system overall. These may include, for instance, that the user must be of a certain age, must be a resident of a certain country, and that the terms may change at any time. The location services section may specify information related to the lifecycle of location user data 118 captured about the user. This may include, for example, how long the data is stored, who can be given the location data (e.g., as specified by the user settings 120), and how to change or stop collection of the location data by the system 100. The third-party access section may specify information regarding the specific data that may be shared with the various mobility services or non-mobility services having access to the user's user data 118 via the user data server 116. In an example, this section may be expanded to illustrate icons of mobility services that may receive user data 118 based on the current user settings 120. Similarly, the biometric settings section may be expanded to illustrate icons of services that may receive biometric user data 118 based on the current user settings 120.

If the user agrees to the terms and conditions, the user may select an accept terms and conditions control 508. If not, then the user will be unable to take advantage of the user data 118 sharing services of the journey planning application 122.

FIG. 5B illustrates an example 500B top-level of hierarchical terms and conditions for the system 100. In a traditional display of terms and conditions, terms are provided in a form of a contract, typically as a lengthy block of text. In such a display, it can be difficult for a user to locate provisions that the user wishes to review. To aid in the location and review of terms and conditions, elements of the terms and conditions can be categorized into a hierarchy. Initially, a top-level set of subcategories of the terms and conditions may be displayed. These subcategories of the hierarchy can be selected to display more detailed information about the terms and conditions for the selected subcategory. Similar to the terms and conditions discussed above, the hierarchical terms and conditions may be displayed in a personalized manner responsive to selection of the terms of service control 208. Accordingly, the hierarchical terms and conditions may be used to communicate the user-specified effects of the selected user settings 120 on sharing of the user data 118 using a layered approach.

As shown, the example 500B illustrates a top-level view of the hierarchical terms and conditions. In an example, the view includes a header 510 giving an overview of the content, and descriptive text 512 and a video 514 providing further information for the displayed category of the hierarchy. In addition, the view includes a set of icons 516 listing the subcategories of the category of the hierarchical terms and conditions. For instance, under the top-level category, the icons 516 list an information subcategory explaining what types of information are being managed, a use subcategory explaining how the collected information is used, a my-profile subcategory explaining how the user can control what information is being gathered and how it is being used, a security subcategory explaining how information is safeguarded, and a commitment subcategory explaining a commitment to manage the information responsibly. Each of the icons may be selectable to bring up further details and subcategories of the selected subcategory.

FIG. 5C illustrates an example 500C of an information subcategory of the hierarchical terms and conditions for the system 100. For instance, the example 500C may be displayed responsive to user selection of the information icon 516 from the example 500B. As shown in the example 500C, the header 510, descriptive text 512, and video 514 are each updated to provide information related to the subcategory of types of information being managed. Additionally, the icons 516 are updated to subcategories of the information subcategory. For instance, the icons 516 now list a vehicle information subcategory explaining how vehicle user data 118 is managed, a device information subcategory explaining how phone or other device user data 118 is managed, an information you share subcategory explaining how the user can choose to share user data 118, a third-party information subcategory explaining how user data 118 may be combined with other information, and an information shared with others subcategory explaining how the system 100 shares user data 118 or other information.

FIG. 5D illustrates an example 500D of a vehicle information subcategory of the information subcategory of hierarchical terms and conditions for the system 100. For instance, the example 500D may be displayed responsive to user selection of the vehicle information icon 516 from the example 500B. As shown in the example 500D, the header 510, descriptive text 512, and video 514 are each updated to provide information related to the subcategory of types of vehicle information being managed. For instance, the icons 516 now list a telematics and diagnostics subcategory explaining how information from the vehicle 102 is used to understand vehicle 102 performance, an in-vehicle services subcategory explaining how information is managed to provide features to the cabin occupants, an authorized service and repair subcategory explaining how information about repairs and service is managed, an information use subcategory explaining how information is used to help the user, and a my-profile subcategory explaining how the user can control what user data 118 is gathered and how it is used. Accordingly, through use of the hierarchical terms and conditions, a user may visually navigate through the terms and conditions to find information, rather than having to scroll through a large quantity of information.

Figure 6:
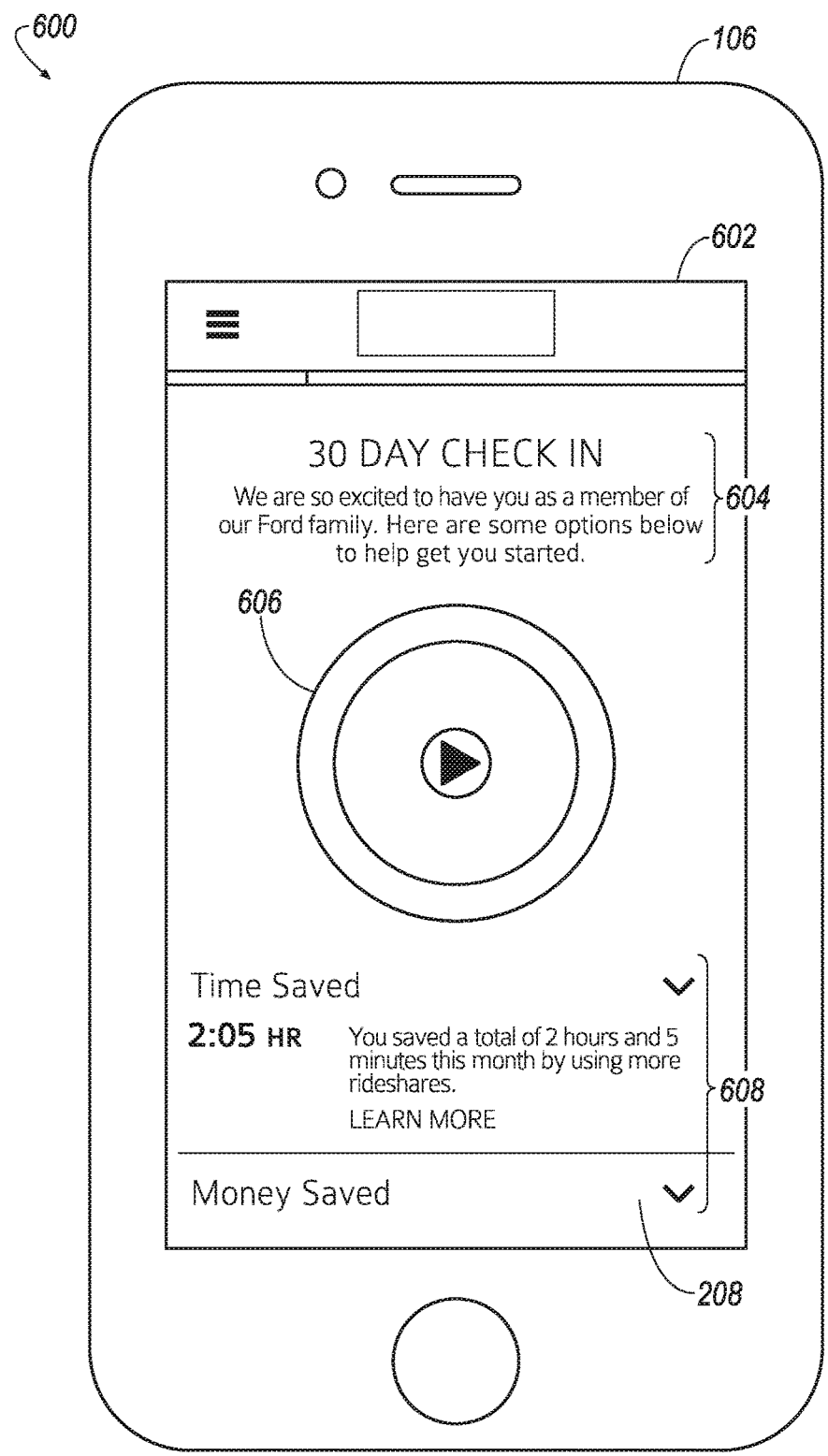
FIG. 6 illustrates an example of a user interface of the journey planning application displaying a check-in feature.

FIG. 6 illustrates an example 600 of a user interface 602 of the journey planning application 122 displaying a check-in feature. In an example, the check-in feature may be displayed by the journey planning application 122 responsive to passage of a predefined time period after which the journey planning application 122 is programmed to provide a status update to the user. As one non-limiting example, the time period may be thirty days. The check-in user interface 602 may include informational text 604 explaining to the user that the provided information gives a snapshot of the benefits that were achieved by the user through the sharing of user data 118.

As shown, the check-in a user interface 602 includes a benefits video 606 and a benefits summary 608. When played back, the benefits video 606 provides explanations of how the user's user data 118 was used to provide the benefits listed in the benefits summary 608. The benefits summary 608 in turn, provides key savings information to the user, such as time saved or money saved through the sharing of user data 118. As some possibilities, time may be saved by the user by using rideshares as opposed to searching for parking when the user drives him or herself to a destination, by the journey planning application 122 offering to place a coffee order to an internet service based on habits or geolocation and time of arrival of the user, or by the journey planning application 122 informing a dry cleaner to have the user's shirts pulled from a conveyer before the user arrives.

In an example, the benefits video 606 may include one or more sections that explain which services were used by the user in achieving the savings. In another example, the benefits video 606 may further include sections that explain additional benefits that may be made available to the user were the user to adjust his or her user settings 120 to allow for the sharing of more user data 118. These benefits may, in an example, be short video portions that correspond to the benefits listed in the benefits feature user interface 402.

Figure 7:
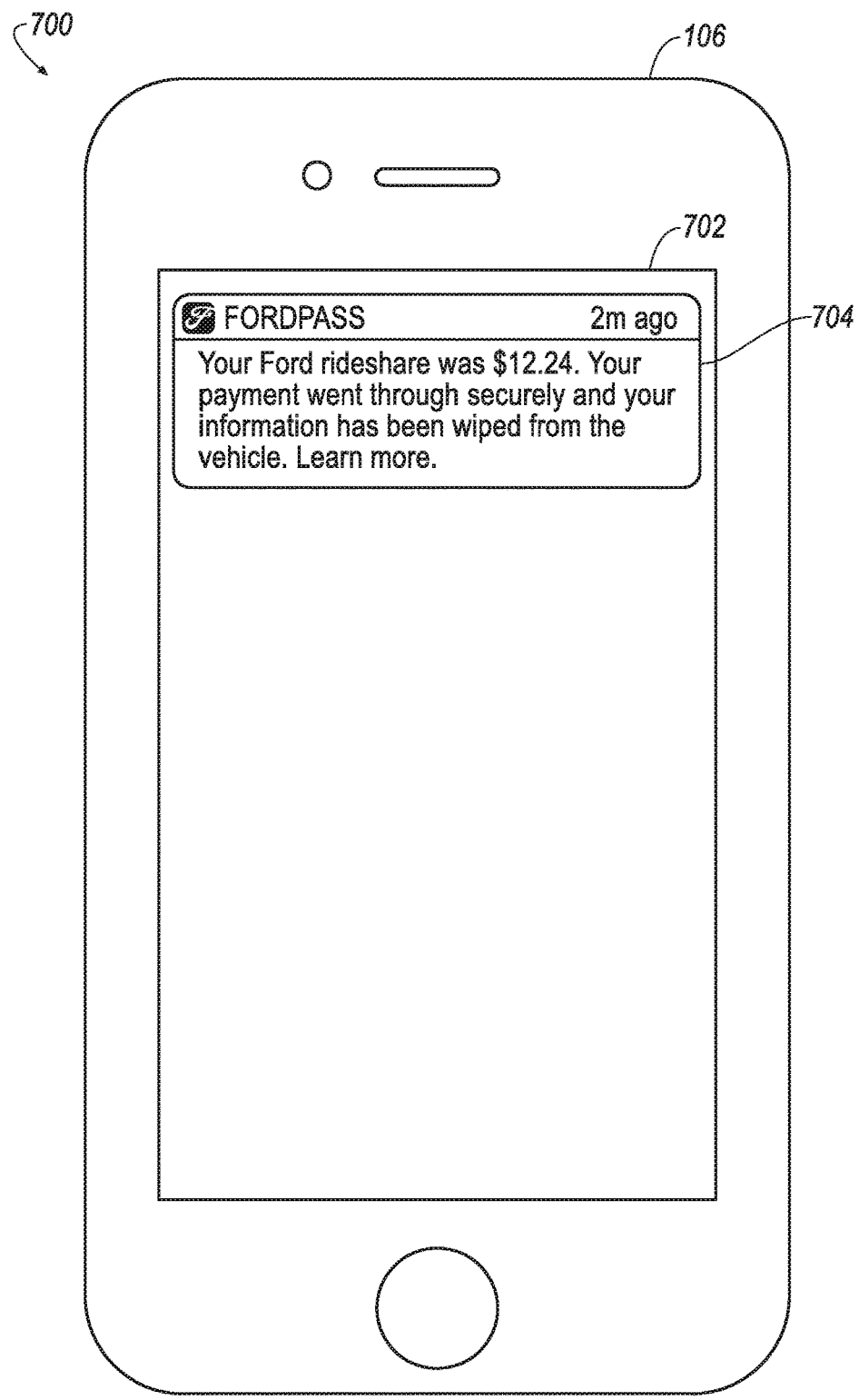
FIG. 7 illustrates an example of a user interface of the journey planning application displaying a privacy notification.

FIG. 7 illustrates an example 700 of a user interface 702 of the journey planning application 122 displaying a privacy notification 704. The privacy notification 704 may be generated by the journey planning application 122 to provide quick information to the user regarding recent activity implicating the user data 118. As shown, the notification indicates to the user that a transaction was performed and that the user data 118 remains secure.

Figure 8:
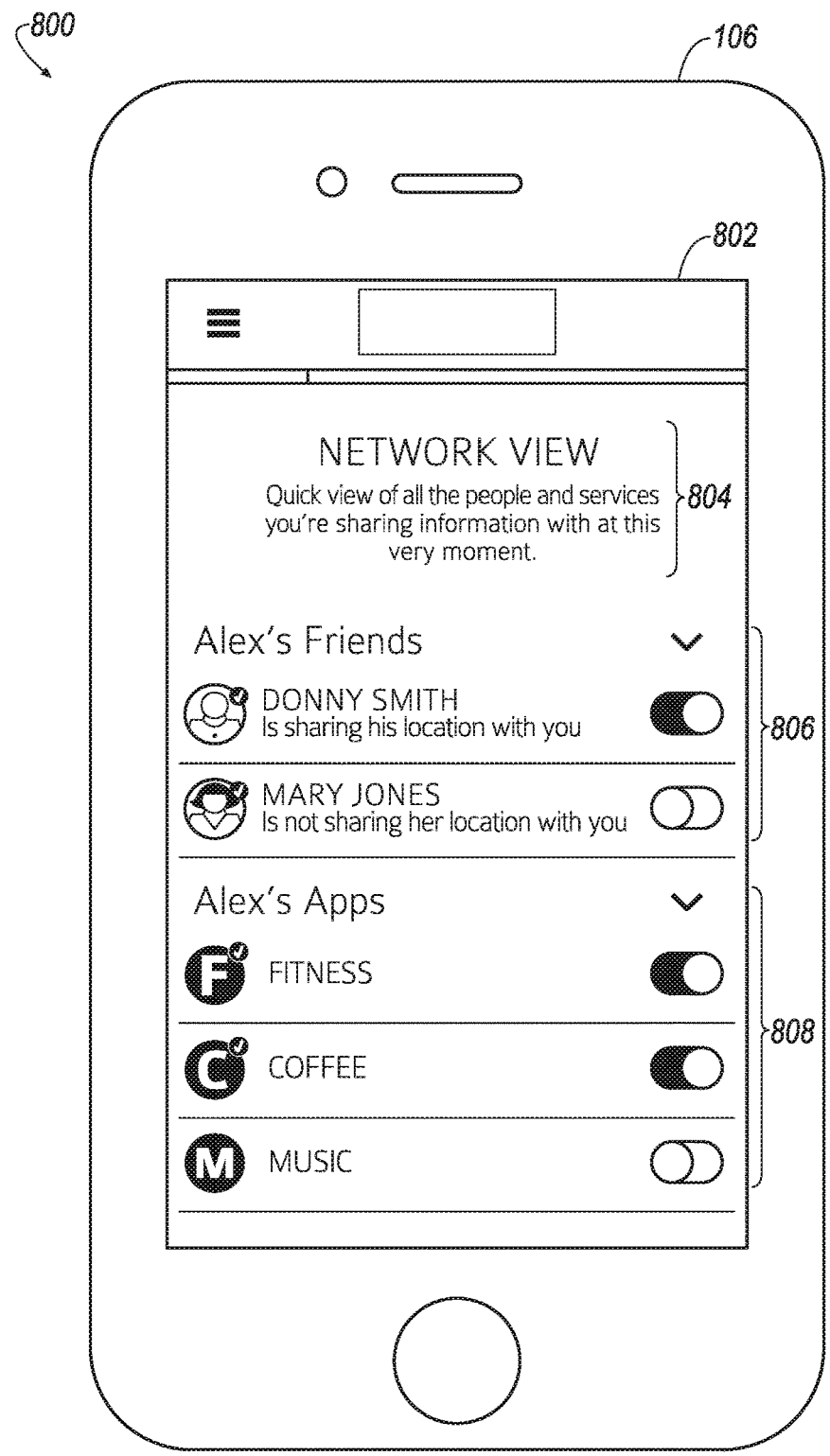
FIG. 8 illustrates an example of a user interface of the journey planning application displaying a network view of the current sharing of the user data.

FIG. 8 illustrates an example 800 of a user interface 802 of the journey planning application 122 displaying a network view of the current sharing of the user data 118. In an example, the sharing user interface 802 may be displayed by the journey planning application 122 responsive to the user selecting to view the current sharing activity. The sharing user interface 802 may include informational text 804 explaining that the user interface 802 provides a listing of receiving users 806 and receiving applications 808 that may receive user data 118 related to the user.

For instance, the listing of receiving users 806 may indicate for each user whether location data is being shared with that user. For each user, the listing of receiving users 806 may further include a toggle control to allow the user to turn on or off providing of user data 118 to the corresponding user. As another example, the listing of receiving applications 808 may indicate for each application if location data is being shared with the corresponding application. Similarly, for each application the listing of receiving applications 808 may further include a toggle control to allow the user to turn on or off providing of user data 118 to the corresponding application.

Figure 9:
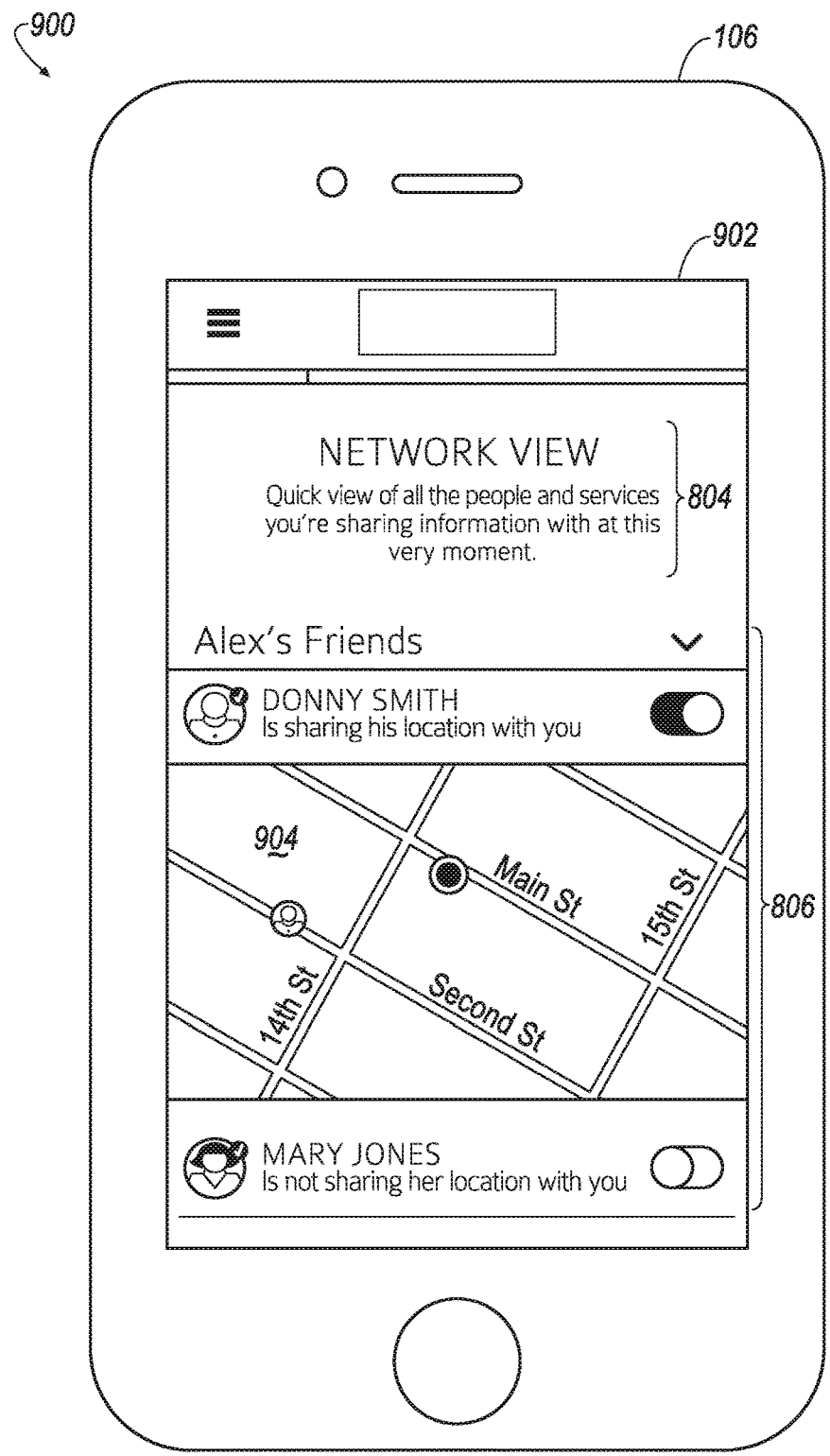
FIG. 9 illustrates an example of a user interface of the journey planning application displaying an expansion of the listing of receiving users.

FIG. 9 illustrates an example 900 of a user interface 902 of the journey planning application 122 displaying an expansion of the listing of receiving users 806. As shown, the location of the user "Donny Smith" is provided to the user on a map 904.

Figure 10:
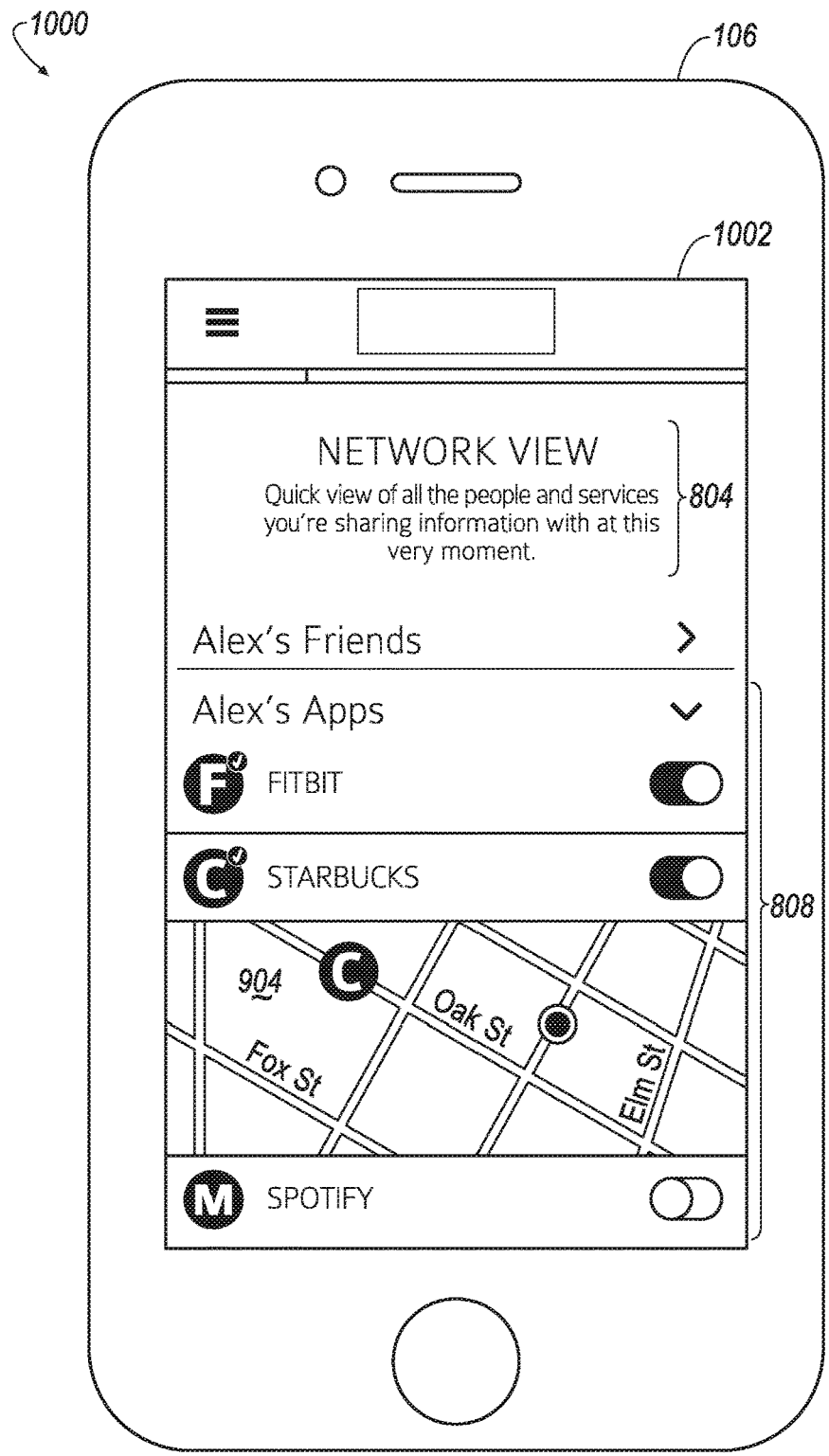
FIG. 10 illustrates an example of a user interface of the journey planning application displaying an expansion of the listing of receiving users.

FIG. 10 illustrates an example 1000 of a user interface 1002 of the journey planning application 122 displaying an expansion of the listing of receiving users 808. As shown, the location of a coffee shop receiving user data 118 from the user and having a drink order ready for the user is provided to the user on the map 904.

Figure 11:
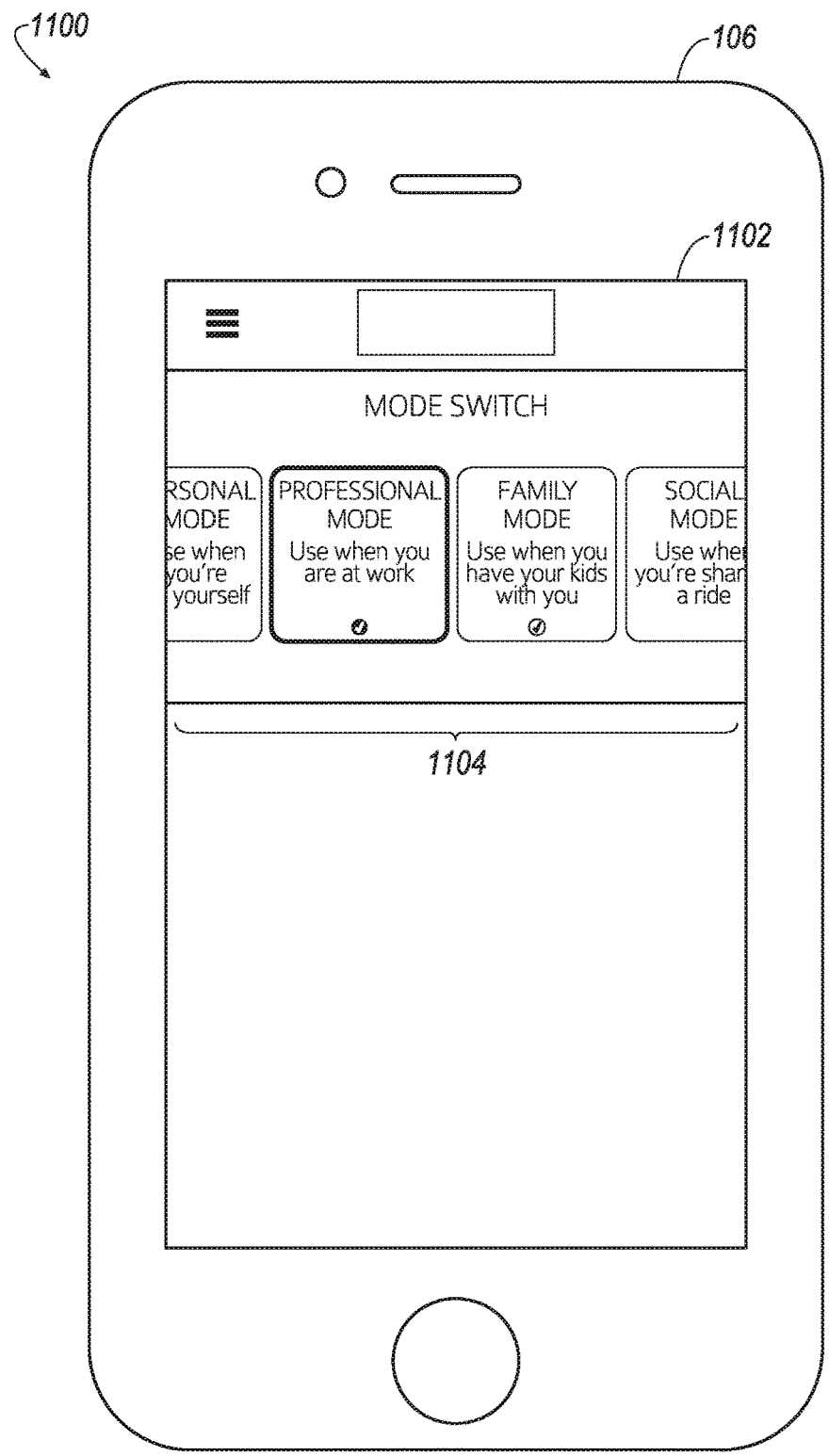
FIG. 11 illustrates an example of a user interface of the journey planning application displaying a selection from different privacy modes.

FIG. 11 illustrates an example 1100 of a user interface 1102 of the journey planning application 122 displaying a selection from different privacy modes. In an example, the mode user interface 802 may be displayed by the journey planning application 122 responsive to the user selecting to change the current privacy mode setting of the journey planning application 122.

As shown, the user interface 1102 provides a mode selection control 1104 for selection from a set of privacy modes. Each privacy mode identifies a theme or profile of user settings 120 specific to the indicated mode. For example, the user may have a first set of user settings 120 for a personal mode in which the mobile device 106 is being used for personal purposes by the user, a second set of user settings 120 for a professional mode in which the mobile device 106 is being used for work purposes, a third set of user settings 120 for a family mode in which the mobile device 106 is being used for family purposes with kids or other family members present, and a fourth set of user settings 120 for a social mode in which the mobile device 106 is being used for personal purposes with friends present. By using the mode selection control 1104, the user can adjust the behavior of the journey planning application 122 in accordance with the current use mode of the user.

The user settings 120 for each mode may include differences based on the different purposes for which the journey planning application 122 is used within the mode. For example, the personal mode and the family mode may associate a personal credit card of the user for use during transactions, while the professional mode may associate a work credit card assigned to the user for use during transactions. As another possibility, the location sharing settings for the user when in the personal mode may be set to off, while location sharing may be set to on for the user when in the family mode, to allow family members to view where the user is located.

The journey planning application 122 may be configured to automatically select between the available modes. In an example, the journey planning application 122 may utilize factors such as time and day or travel destination to adjust the current mode. For instance, if the current time is after 5:00 PM on Monday and the user is going to travel to pick up his or her children at a daycare provider, the journey planning application 122 may identify to switch the mode to family mode. In one example, the journey planning application 122 may prompt the user to switch the mode to "family." In another example, the journey planning application 122 may automatically change the mode to "family."

Figure 12:
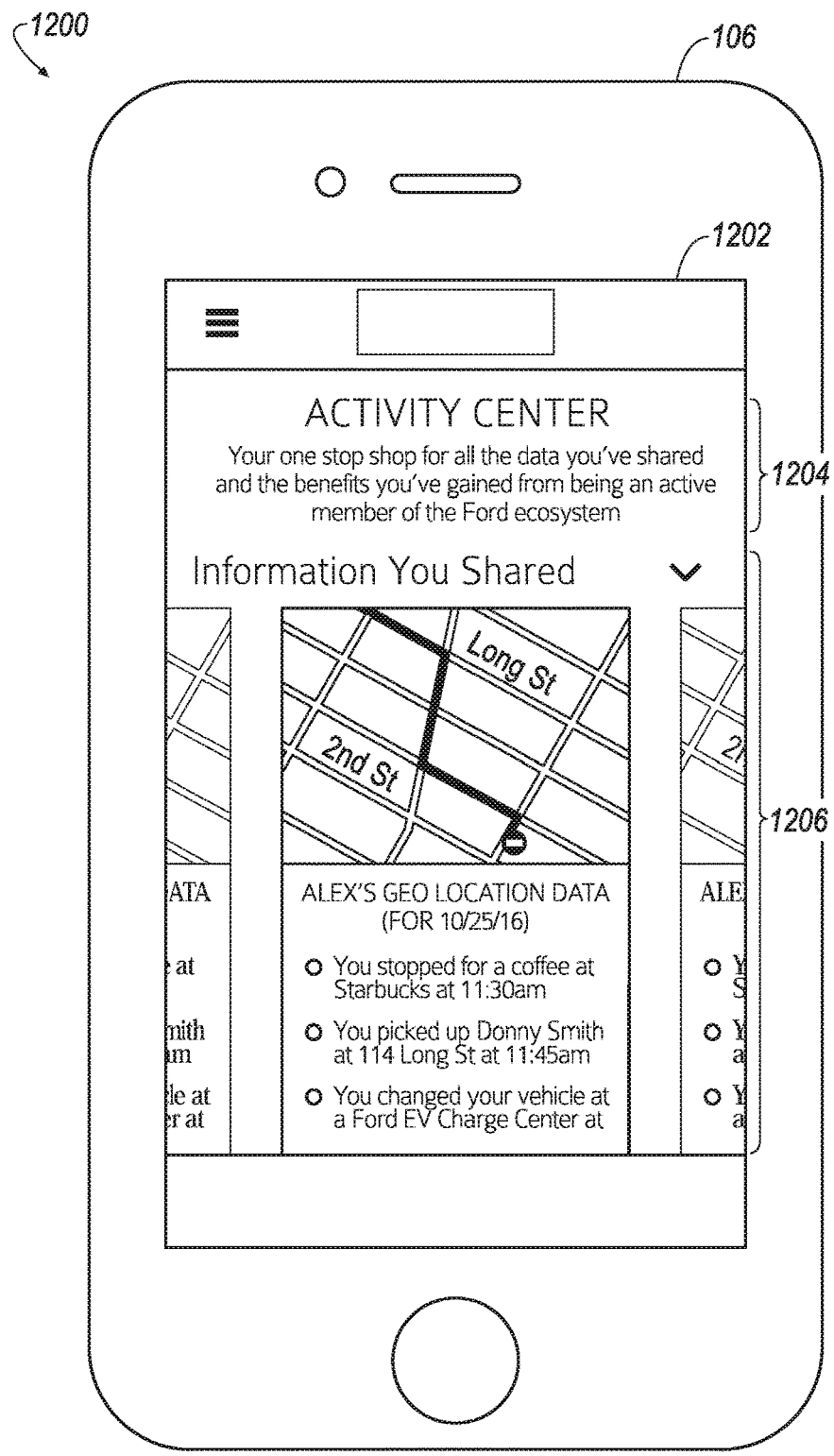
FIG. 12 illustrates an example of a user interface of the journey planning application displaying a history portion of an activity center.

FIG. 12 illustrates an example 1200 of a user interface 1202 of the journey planning application 122 displaying a history portion of an activity center. In an example, the activity center user interface 1202 may be displayed by the journey planning application 122 responsive to the user selecting to view recent activity for user data 118 managed by the system 100.

As shown, the activity center user interface 1202 includes informational text 1204 explaining that the user interface 1202 provides a listing of the user data 118 of the user that is shared and the benefits that have been gained by the sharing of that user data 118 within the system 100. The activity center user interface 1202 may further include a shared data listing 1206 enumerating the events of the user at which user data 118 was shared from the user data server 116 to internet services or to mobility services. For instance, the shared data listing 1206 may include a listing of the data exchange history specifying for each share what user data 118 was shared and what user data 118 was used.

Figure 13:
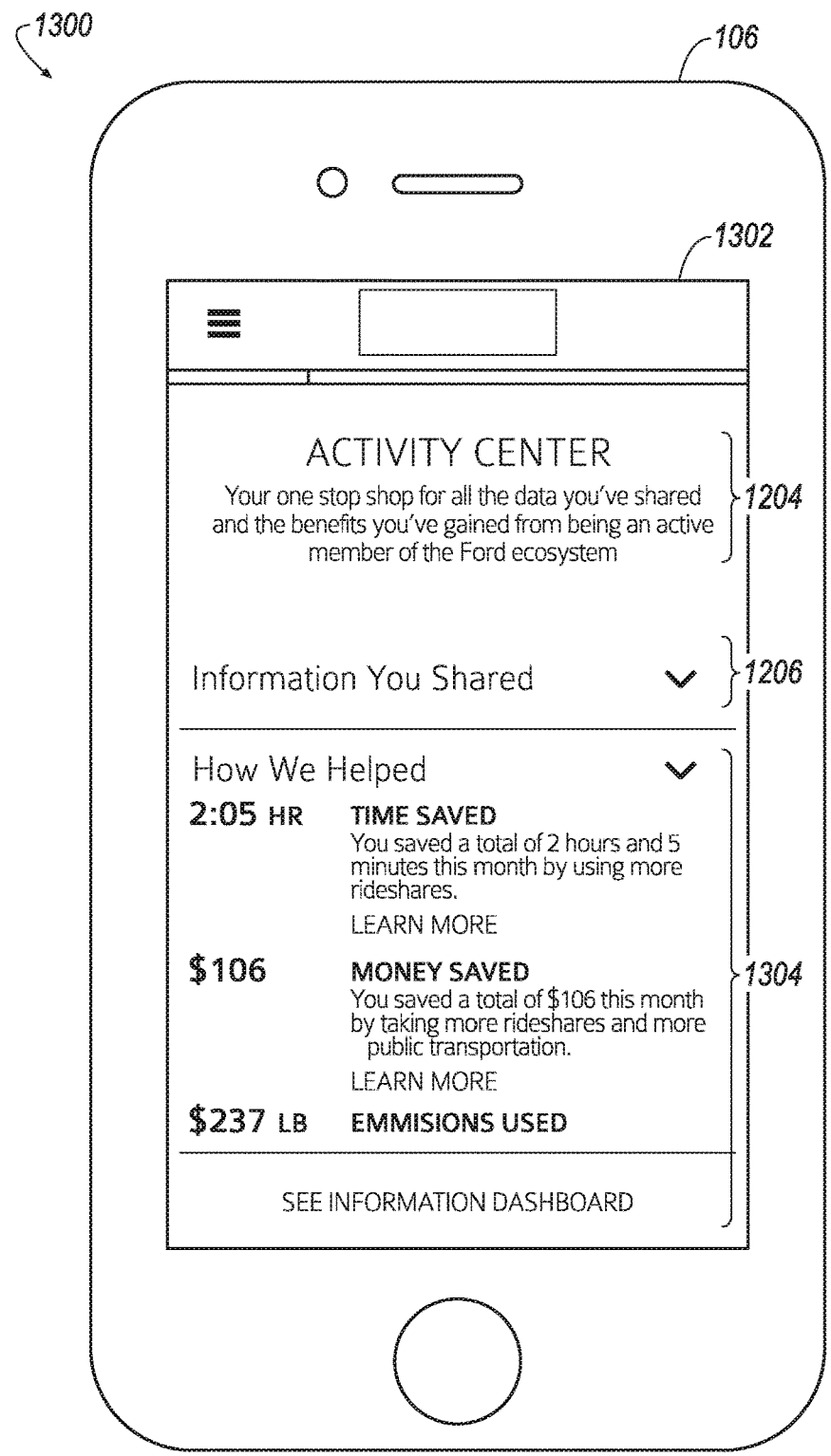
FIG. 13 illustrates an example of a user interface of the journey planning application displaying a benefits portion of the activity center.

FIG. 13 illustrates an example 1300 of a user interface 1302 of the journey planning application 122 displaying a benefits portion of the activity center. In the user interface 1302, the shared data listing 1206 is collapsed (e.g., via user selection to close it), while a benefits listing 1304 is expanded. The benefits listing 1304 includes a history of how the data exchanges made by the user provided benefits to the user. By providing the benefits listing 1304, the journey planning application 122 may both provide insight to the user regarding the user data 118 that was shared, but moreover, the journey planning application 122 can improve the user's perception of how sharing of user data 118 improves the experience of the user in journey planning.

The benefits may be calculated in various ways. In an example, based on publicly available information and information collected from other users, the system 100 may track alternate travel paths and costs. Based on the alternate travel path travel times and cost information to a destination, the system 100 may identify that had a user waited and taken a bus or subway rather than a rideshare, the resultant journey would have taken additional time (e.g., an additional number of minutes to get to the destination). In another example, cost savings may be calculated based on the path taken versus other possible paths. For instance, a cost of the rideshare may be compared to a cost to the user for using the user's personal vehicle 102, accounting for vehicle 102 fuel efficiency, wear and tear, distance traveled, and parking costs.

Figure 14:
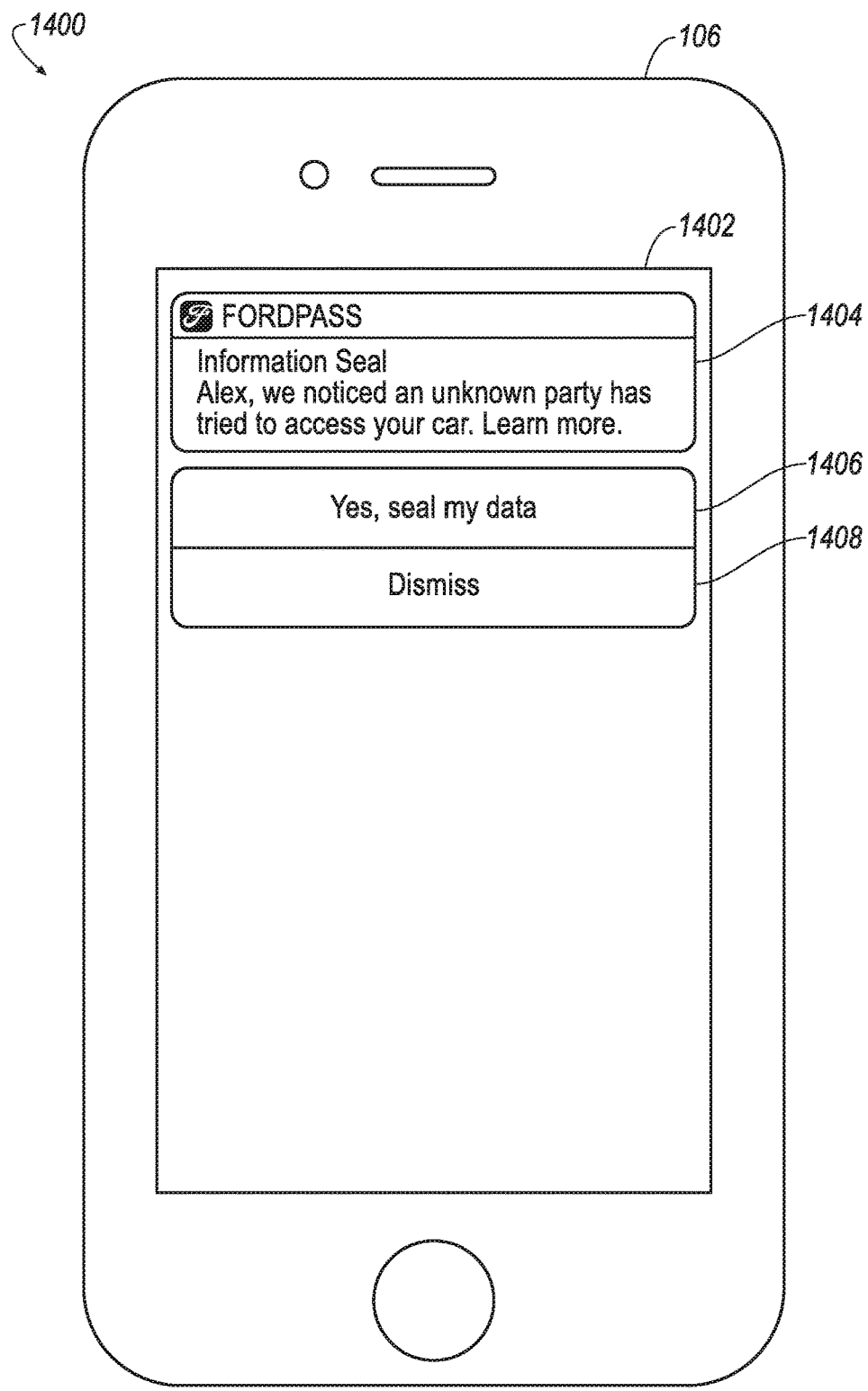
FIG. 14 illustrates an example of a user interface of the journey planning application displaying an information seal notification.

FIG. 14 illustrates an example 1400 of a user interface 1402 of the journey planning application 122 displaying an information seal notification 1404. The information seal notification 1404 may be generated by the journey planning application 122 responsive to preemptive detection by the system 100 of an occurrence that may change how a user may wish to share his or her user data 118. For instance, a user may hand off his or her vehicle 102 to a valet or may allow several friends into the vehicle 102. In such a situation, the user may wish to share user data 118 differently. As shown, the information seal notification 1404 indicates that a party such as a valet is utilizing a vehicle 102 that is registered with the journey planning application 122 as sharing user data 118 related to the user. In response to that indication, the journey planning application 122 provides options 1406, 1408 to the user to either seal the user data or dismiss the information seal notification 1404. For example, if the user accepts for the valet or friend to access the vehicle 102, the user may select the dismiss control 1408 to ignore the alert. If, however, the potential for access is not desired, the user may select the seal data control 1406 to ensure that the current vehicle 102 occupants are only able to obtain user data 118 of the user consistent with the user's desires. As one possibility, the data seal may change the privacy mode from personal mode to professional mode.

Figure 15:
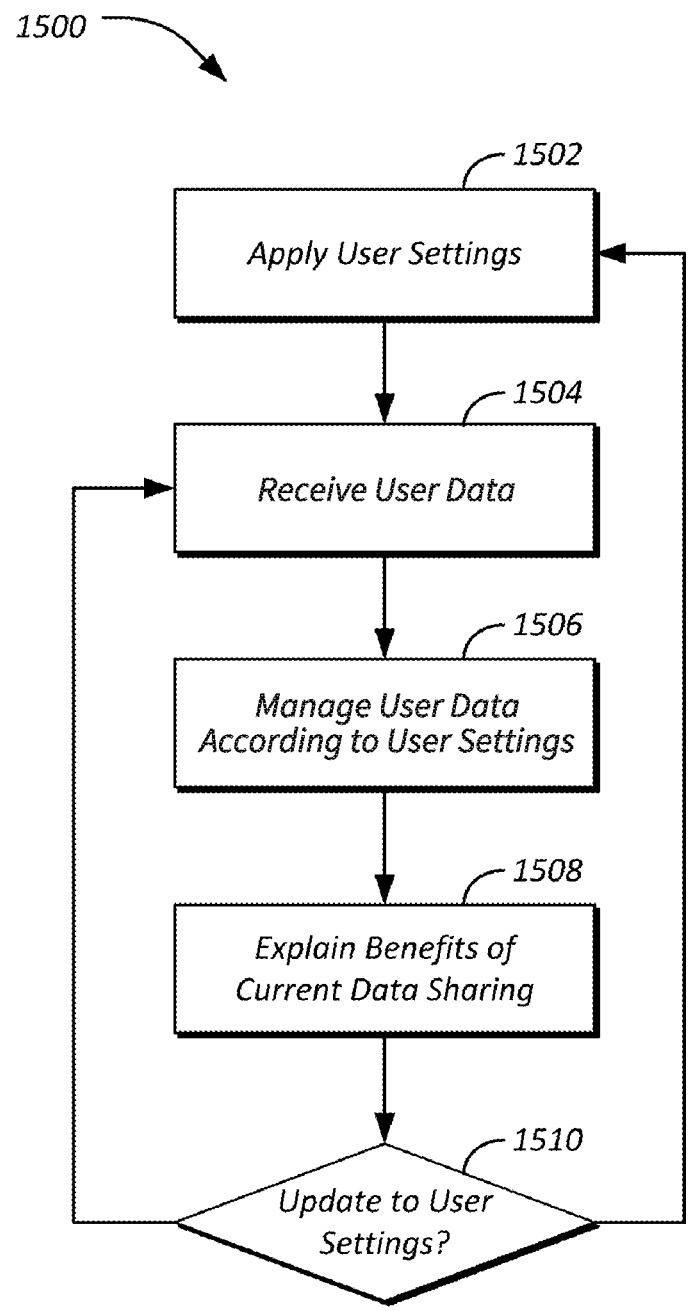
FIG. 15 illustrates an example process for providing portable privacy management.

FIG. 15 illustrates an example process 1500 for providing portable privacy management. In an example, the process 1500 may be performed by the system 100 discussed in detail above. At 1502, the system 100 applies user settings 120 of the user. In an example, the journey planning application 122 may receive the user settings 120 via one or more user interfaces. For instance, the journey planning application 122 may receive selection of applications installed to the mobile device 106 to be scanned for user settings 120. As another possibility, the journey planning application 122 may guide the user to choose settings by offering a set of "fun" questions to the user to guide the user. As yet a further possibility, the journey planning application 122 may provide a listing of benefits from which the user may select the benefits to apply. As an even further example, the journey planning application 122 may allow the user to choose between different modes of user settings 120 based on the current use case for the mobile device 106. Regardless of approach, the journey planning application 122 may indicate the selected user settings 120 over the wide-area network 108 to the user data server 116. In one or more examples, the user settings 120 may be maintained via a distributed hash table providing permissions to user data 118 maintained in a blockchain data store.

At 1504, the system 100 receives user data 118. In an example, the user data server 116 receives location user data 118 from one or more vehicles 102. In another example, the user data server 116 receives purchase or other transaction history from one or more mobility service servers 112 or internet service servers 114. In one or more examples, the user data 118 is added to the blockchain as user data, with pointers to the data managed via the user settings 120 in accordance with the off-blockchain data.

At 1506, the system 100 manages the user data 118 in accordance with the user settings 120. In an example, the user data server 116 may authorize affinity partners of the user data server 116 to access user data 118 in accordance with affinity partner user settings 120, and may authorize non-affinity partners to access user data 118 in accordance with settings specific to the non-affinity partner as specified by the user. In another example, the system 100 may allow access to the user data 118 to the services of the system 100 in accordance with verification of the requestor and requested data based on the user settings 120 of the user.

At 1508, the system 100 explains benefits of the current data sharing. In an example, the user data server 116 may direct the journey planning application 122 to display information indicative of the benefits of the sharing of user data 118, examples of which are discussed above with respect to the user interfaces 602, 1202, and 1302. At 1510, the system determines whether an update was made to the user settings 1210. If so, control returns to operation 1502 to apply the updated user settings 120. If not, control returns to operation 1504 to receive additional user data 118.

While many operations described herein are discussed in terms of a mobile device 106 and a journey planning application 122, it should be noted that in other examples the sharing of user data 118 may be achieved by the user data server 116 for other types of devices or applications. In an example, other devices such as a refrigerator or an Internet-of-Things (IoT) device may be configured to access the user data server 116 to selectively share in the user data 118 of the user in accordance with the user settings 120. For instance, the refrigerator may be a connected device programmed to remind the user to pick up needed groceries according to the location of the user. In another example, other applications unrelated to journey planning may utilize the services of the user data server 116 with regard to the sharing of user data 118.

Computing devices described herein, such as the VCS 104, mobile device 106, mobility service server 112, internet service server 114, and user data server 116, generally include computer-executable instructions where the instructions may be executable by one or more computing devices such as those listed above. Computer-executable instructions, such as those of the function request application 128 and mobile function application 136, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus, the claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computing device comprising:
a processor programmed to execute an application to:
receive responses to a set of questions for determining settings for sharing of user data,
identify user settings defining the sharing of user data consistent with data indicative user settings of users who answered the questions in the same manner,
display terms of service for the sharing of user data based on the user settings, and
display a check-in interface responsive passage of a predefined time period after which the application is programmed to provide a status update to the user, the check-in interface including a snapshot of benefits that were achieved through the sharing of user data, wherein the predefined time period is thirty days.

2. The computing device of claim 1, wherein the questions are unrelated to the sharing of user data.

3. The computing device of claim 1, wherein the questions explicitly request sharing of one or more elements of user data.

4. The computing device of claim 1, wherein the benefits include time saved or cost saved through the sharing of user data in accordance with the user settings.

5. The computing device of claim 1, wherein the processor is further programmed to:
display a listing of available benefits, each benefit listing one or more advantages available if an element of user data is shared,
receive a selection of one or more of the available benefits,
add the selected available benefits to a listing of chosen benefits; and
update the user settings to share the elements of user data included in the benefits of the listing of chosen benefits.

6. The A computing device comprising:
a processor programmed to execute an application to:
receive responses to a set of questions for determining settings for sharing of user data,
identify user settings defining the sharing of user data consistent with data indicative user settings of who answered the questions in the same manner,
display terms of service for the sharing of user data based on the user settings,
display a listing of modes, each mode corresponding to a profile of user settings, the modes including a personal mode in which the computing device is being used for personal purposes, a professional mode in which the computing device is being used for work purposes, a family mode in which the computing device is being used for family purposes with kids or other family members present, and a social mode in which the computing device is being used for personal purposes with friends present;
receive a selection of one of the modes; and
transition to use of the profile of user settings for the selected mode,
wherein the personal mode and the family mode specify user settings that associate a personal credit card use during transactions with third party services accessing user data, while the professional mode specifies user settings that associate a work credit dard for use during transactions.

7. A non-transitory computer readable medium comprising instructions of an application that, when executed by a processor of a mobile device, cause the mobile device to:
determine user settings for sharing of user data for a user account;
display, responsive to passage of a predefined time period, a check-in interface to provide a status update including a snapshot of benefits that were achieved through the sharing of user data;
explain additional benefits available were the user setting to further allow for sharing of additional user data;
display a listing of modes, each mode corresponding to a profile of user settings, the modes including a personal mode in which the mobile device is being used for personal purposes, a professional mode in which the mobile device is being used for work purposes, a family mode in which the mobile device is being used for family purposes with kids or other family members present, and a social mode in which the mobile device is being used for personal purposes with friends present;
receive a selection of one of the modes; and
transition to use of the profile of user settings for the selected mode,
wherein the personal mode and the family mode specify user settings that associate a personal credit card for use during transactions with third party services accessing user data, while the professional mode specifies user settings that associate a work credit card for use during transactions.

8. The medium of claim 7, further comprising instructions that, when executed by the mobile device, cause the mobile device to:
receive responses to a set of questions unrelated to sharing of user data; and determine the user settings consistent with data indicative of user settings of users who answered the questions in the same manner.

9. The medium of claim 7, further comprising instructions that, when executed by the mobile device, cause the mobile device to:
- display a listing of available benefits, each benefit listing one or more advantages available if an element of user data is shared,
- receive a selection of one or more of the available benefits,
- add the selected available benefits to a listing of chosen benefits; and
- update the user settings to share the elements of user data included in the benefits of the listing of chosen benefits.

10. The medium of claim 7, further comprising instructions that, when executed by the mobile device, cause the mobile device to:
- scan the mobile device for installed applications that match to a list of applications having application settings related to the user settings;
- display the matching installed applications;
- receive a selection of at least a subset of the matching installed applications; and
- update the user settings according to application settings of the matching installed applications that are selected.

* * * * *